(12) United States Patent
Prasad et al.

(10) Patent No.: US 11,151,328 B2
(45) Date of Patent: Oct. 19, 2021

(54) USING NEURAL NETWORK AND SCORE WEIGHING TO INCORPORATE CONTEXTUAL DATA IN SENTIMENT ANALYSIS

(71) Applicant: Oracle International Corporation, Redwood Shores, CA (US)

(72) Inventors: Kyasaram Vishwa Prasad, Hyderabad (IN); Margaret Sue Lloyd, Menlo Park, CA (US); Srikanth S. Nandula, San Jose, CA (US); Anilkumar Gande, Hyderabad (IN); Naveen Jafer Nizar, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 202 days.

(21) Appl. No.: 16/529,726

(22) Filed: Aug. 1, 2019

(65) Prior Publication Data

US 2021/0034708 A1 Feb. 4, 2021

(51) Int. Cl.
*G06F 40/30* (2020.01)
*G06N 3/08* (2006.01)
*G06N 3/04* (2006.01)

(52) U.S. Cl.
CPC .............. *G06F 40/30* (2020.01); *G06N 3/04* (2013.01); *G06N 3/08* (2013.01)

(58) Field of Classification Search
CPC ......... G06F 17/2785; G06N 3/08; G06N 3/04
See application file for complete search history.

(56) References Cited

U.S. PATENT DOCUMENTS 9,251,530 B1 2/2016 Dachis et al.
10,120,859 B2 11/2018 Parikh et al.
(Continued)

OTHER PUBLICATIONS

Baro et al., "Classification of project management tool reviews using machine learning-based sentiment analysis," IOP Conference Series Materials Science and Engineering, vol. 482, No. 1, available online at < https://iopscience.iop.org/article/10.1088/1757-899X/482/1/012041 >, 2019, 2 pages.
(Continued)

*Primary Examiner* — Kevin Ky
(74) *Attorney, Agent, or Firm* — Invoke

(57) ABSTRACT

An artificial neural network (ANN) determines a conversation snippet sentiment score based on content of the conversation snippet and contextual attributes associated with the conversation snippet. Contextual attributes may include, for example, a role within an organizational hierarchy of a user participating in the conversation snippet. Information representing the content is input into a hidden layer sequence of the ANN; information representing the contextual attributes is input into another hidden layer sequence of the ANN. Additionally or alternatively, a weighing engine determines a topical sentiment score by aggregating weighted conversation snippet sentiment scores. Weights to be applied to the conversation snippet sentiment scores may be determined based on, for example, a proportion of conversation snippets associated with the same topic that are conducted on a particular conversation channel as compared with other conversation channels, and respective roles of users participating in the conversation snippets conducted on the particular conversation channel.

22 Claims, 14 Drawing Sheets

(56) References Cited

U.S. PATENT DOCUMENTS

| | | | | |
|---|---|---|---|---|
| 10,162,844 | B1* | 12/2018 | McCord | G06N 7/005 |
| 2013/0197967 | A1 | 8/2013 | Pinto et al. | |
| 2016/0239774 | A1 | 8/2016 | Babar | |
| 2016/0379229 | A1 | 12/2016 | Akkiraju et al. | |
| 2019/0034963 | A1* | 1/2019 | George | G06N 5/04 |
| 2019/0050875 | A1* | 2/2019 | McCord | G06Q 30/0201 |
| 2019/0156153 | A1* | 5/2019 | Can | G06F 16/24568 |
| 2019/0332694 | A1* | 10/2019 | Tcherechansky | G06N 3/082 |
| 2020/0125639 | A1* | 4/2020 | Doyle | G10L 15/197 |
| 2020/0126533 | A1* | 4/2020 | Doyle | G10L 15/1815 |
| 2020/0177403 | A1* | 6/2020 | Vazquez-Rivera | G06Q 10/10 |
| 2020/0380389 | A1* | 12/2020 | Eldeeb | G06F 16/9535 |

OTHER PUBLICATIONS

How Sentiment Analysis Helps the Project Manager, available online at < https://stonemeadow-consulting.com/the-pm-blog/blog/how-sentiment-analysis-helps-the-project-manager >, 2019, 2 pages.

Jerome Maisch, "How to predict the future using Social Media Monitoring," available online at < https://blog.digimind.com/en/insight-driven-marketing/predict-future-using-smm >, Feb. 4, 2014, 2 pages.

Robinson et al., "Developer Behavior and Sentiment from Data Mining Open Source Repositories," Hawaii International Conference on System Sciences, available online at < https://www.researchgate.net/publication/290437566_Developer_Behavior_and_Sentiment_from_Data_Mining_Open_Source_Repositories >, 2016, 3 pages.

Shin et al., "Lexicon Integrated CNN Models with Attention for Sentiment Analysis," Proceedings of the 8th Workshop on Computational Approaches to Subjectivity, Sentiment and Social Media Analysis, 2017, pp. 149-158.

Vasu Jain et al., "Prediction of Movie Success using Sentiment Analysis of Tweets," The International Journal of Soft Computing and Software Engineering, vol. 3, No. 3, 2013, pp. 308-313.

Yoon Kim, "Convolutional Neural Networks for Sentence Classification," Proceedings of the 2014 Conference on Empirical Methods in Natural Language Processing (EMNLP), 2014, pp. 1746-1751.

* cited by examiner

USING NEURAL NETWORK AND SCORE WEIGHING TO INCORPORATE CONTEXTUAL DATA IN SENTIMENT ANALYSIS

TECHNICAL FIELD

The present disclosure relates to neural networks and score weighing. In particular, the present disclosure relates to using neural network and score weighing to incorporate contextual data in sentiment analysis.

BACKGROUND

Conversations may occur through a variety of conversation channels, such as social media platforms, instant messaging systems, email, and project management applications. Users may communicate about a variety of topics using one or more conversation channels. Different users may have individual views, attitudes, and/or opinions towards a particular topic. The users as a group may have a collective view, attitude, and/or opinion towards a particular topic. An individual and/or collective view towards a topic may be referred to as a "sentiment."

A level of sentiment towards a particular topic may guide managers or other stakeholders to take certain action. As an example, a software development team may communicate positively about a particular in-progress project. The positive sentiment may indicate to the managers that the project is going well, and that the likelihood of meeting an upcoming milestone deadline is high. The managers may thus indicate to the customers that the project will be timely completed. As another example, students may communicate negatively about a particular class. The negative sentiment may indicate to the professor that the students have not fully grasped the lesson material. The professor may thus adjust the difficulty of homework assignments accordingly. As another example, citizens of a community may communicate negatively about a particular community leader. The community leader may thus adjust his agenda and/or political campaign.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
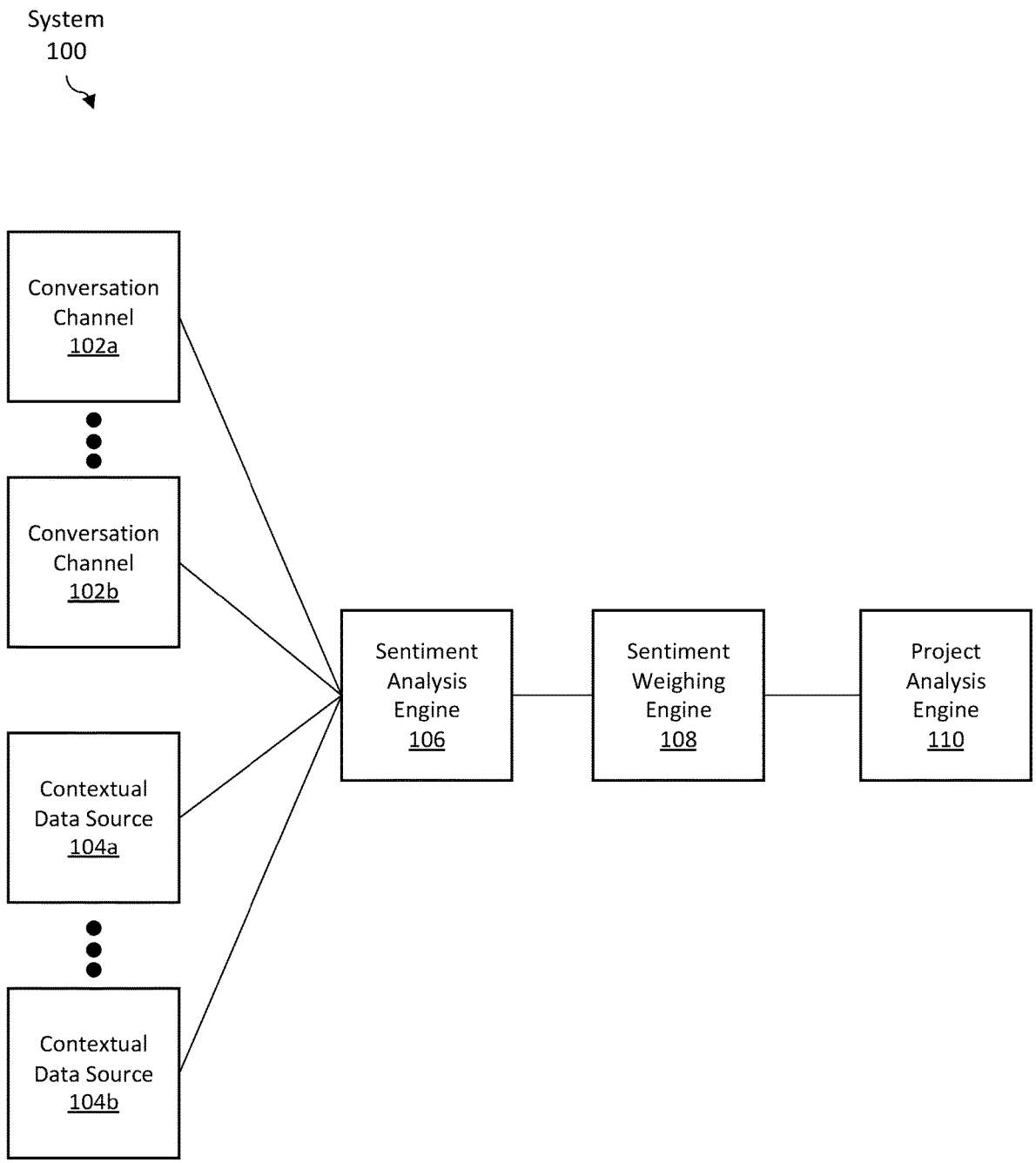
FIG. 1 illustrates an overall sentiment analysis system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. OVERALL SENTIMENT ANALYSIS SYSTEM ARCHITECTURE
2.1 CONVERSATION SNIPPET SENTIMENT ANALYSIS SYSTEM
2.2 PROJECT PHASE SENTIMENT ANALYSIS SYSTEM
2.3 PROJECT MANAGEMENT ANALYSIS SYSTEM
3. DETERMINING A CONVERSATION SNIPPET SENTIMENT SCORE
4. DETERMINING A PROJECT PHASE SENTIMENT SCORE
5. DETERMINING A PROJECT MANAGEMENT SCORE
6. TRAINING A NEURAL NETWORK FOR DETERMINING CONVERSATION SNIPPET SENTIMENT SCORES
7. TRAINING A NEURAL NETWORK FOR DETERMINING PROJECT MANAGEMENT SCORES
8. EXAMPLE EMBODIMENT
9. HARDWARE OVERVIEW
10. MISCELLANEOUS; EXTENSIONS

1. General Overview

One or more embodiments include determining a conversation snippet sentiment score. An artificial neural network (ANN), referred to herein as a "sentiment analysis engine," determines a conversation snippet sentiment score based on content of the conversation snippet and contextual attributes associated with the conversation snippet. Content of a conversation snippet is converted into one or more document matrices. The document matrices are input into one or more hidden layer sequences of the ANN. Additionally, contextual attributes associated with the conversation snippet is converted into a context vector. Contextual attributes may include, for example, a role within an organizational hierarchy of a user participating in the conversation snippet, and a current project phase of a project that the conversation snippet is about. The context vector is input into a hidden layer sequence of the ANN. The hidden layer sequence may include, for example, a multilayer perceptron. Each hidden layer of the ANN produces a respective intermediate representation. The intermediate representations are input into an output layer. The output layer may include, for example, a softmax layer. The output layer produces a conversation snippet sentiment score.

One or more embodiments include determining a topical sentiment score based on conversation snippet sentiment scores. A topical sentiment score may represent, for example, an overall sentiment towards a particular topic (such as an in-progress project within a company). A topical sentiment score is determined by aggregating weighted conversation snippet sentiment scores. The weight applicable to a particular conversation snippet sentiment score is determined based on weighing attributes associated with the particular conversation snippet. Weighing attributes may include, for example, a proportion of conversation snippets associated with a particular topic that are conducted on a particular conversation channel as compared with other conversation channels, and respective roles of users participating in the conversation snippets conducted on the particular conversation channel.

One or more embodiments described in this Specification and/or recited in the claims may not be included in this General Overview section.

2. Overall Sentiment Analysis System Architecture

FIG. 1 illustrates an overall sentiment analysis system, in accordance with one or more embodiments. As illustrated in FIG. 1, a system 100 includes one or more conversation channels 102a-b, one or more contextual data sources 104a-b, a sentiment analysis engine 106, a sentiment weighing engine 108, and a project phase sentiment score 110. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a conversation channel (such as any of conversation channels 102a-b) refers to a method or manner in which a conversation is conducted between users. A conversation may include one or more messages transmitted from a user to another user. Examples of conversation channels include a social media platform, an instant messaging platform, an electronic mail (email) platform, a directory of meeting minutes, a directory of meeting presentations, a project management application, a debugging application, a version tracking application, and a customer service application.

One or more conversation snippets are obtained from a conversation channel. A conversation snippet is any portion of a conversation conducted through a conversation channel. As an example, a conversation snippet may refer to a single instant message sent through an instant messaging system. As another example, a conversation snippet may refer to multiple instant messages exchanged between a particular group of users within a particular time period through an instant messaging system. As another example, a conversation snippet may refer to a report (such as a bug report) made available to a group of users through a project management application (such as a debugging application). As another example, a conversation snippet may refer to a report and comments responding thereto published through a project management application. As another example, a conversation snippet may refer to an email, or a portion thereof, or an email chain exchanged through an email system.

In one or more embodiments, a contextual data source (such as any of contextual data sources 104a-b) refers to any data source for obtaining contextual attributes associated with conversation snippets. A contextual attribute is any information associated with a conversation snippet, examples of which are provided below.

Contextual attributes may include attributes related to a user participating in a conversation snippet, such as:
- (a) a role of the user within an organizational hierarchy (for example, software engineer, product manager, sales manager, and chief executive officer);
- (b) a work location of the user;
- (c) a work experience, pedigree, level of expertise, and/or area of expertise of the user;
- (d) a collaborator group of the user;
- (e) a number of conversation snippets conducted by the user, as compared with other users;
- (f) a status of the user in a social network and/or general community;
- (g) a numbers of followers of the user in a social network;
- (h) a popularity of the user.

Contextual attributes may include attributes related to a topic or project that a conversation snippet is about, such as:
- (a) a type of the topic (such as politics, sports, entertainment, health, science);
- (b) a project size of the project;
- (c) a project phase of the project during which the conversation snipper is conducted;
- (d) a duration of time from the time the conversation snippet is conducted until a next milestone deadline of the project;
- (e) a number of conversation snippets associated with the topic, as compared with other topics.

Contextual attributes may include attributes related to a particular conversation channel on which a conversation snippet is conducted and/or other available conversation channels, such as:
- (a) a distribution of a set of conversation snippets, associated with a same topic, across the conversation channels;
- (b) a proportion of conversation snippets, associated with the same topic, on the particular conversation channel as compared with the other conversation channels;
- (c) a number of users participating in conversation snippets, associated with the same topic, on the particular conversation channel as compared with the other conversation channels;

(d) respective roles of the users participating in conversation snippets, associated with the same topic, on the particular conversation channel;

(e) a frequency at which users of certain roles participate in conversations on the particular conversation channel as compared with other conversation channels.

Contextual attributes may include attributes related to the environment associated with a conversation snippet, such as:

(a) a time or day during which the conversation snippet is conducted.

Contextual attributes may include attributes related to the content of a conversation snippet, such as:

(a) a number of tokens (such as words, word phrases, characters, emoticons) within the content that are associated with a positive sentiment;

(b) a number of tokens within the content that are associated with a negative sentiment;

(c) whether the conversation snippet ends with an exclamation and a positive token;

(d) whether the conversation snippet ends with an exclamation and a negative token.

In one or more embodiments, information obtained from conversational channels 102a-b and/or contextual data sources 104a-b are stored in one or more data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as a conversational channels 102a-b and/or contextual data sources 104a-b. Alternatively or additionally, a data repository may be implemented or executed on a computing system separate from a conversational channels 102a-b and/or contextual data sources 104a-b. The data repository may be communicatively coupled to the conversational channels 102a-b and/or contextual data sources 104a-b via a direct connection or via a network.

In one or more embodiments, a sentiment analysis engine 106 includes an artificial neural network (ANN) configured to determine a conversation snippet score as a function of content of the conversation snippet and contextual attributes associated with the conversation snippet. A sentiment analysis engine 106 obtains content of one or more conversation snippets from one or more conversation channels 102a-b. A sentiment analysis engine 106 obtains contextual attributes associated with one or more conversation snippets from one or more contextual data sources 104a-b. A sentiment analysis engine 106 is described in further detail below with reference to FIGS. 2-5. Examples of operations for determining a conversation snippet sentiment score are described below with reference to FIG. 8. Examples of operations for training a project analysis engine 110 are described below with reference to FIG. 11.

In one or more embodiments, a sentiment weighing engine 108 refers to hardware and/or software configured to determine a topical sentiment score based on conversation snippet sentiment scores. A sentiment weighing engine 108 obtains sentiment scores for conversation snippets associated with a same topic from a sentiment analysis engine 106. The topic, may be, for example, a particular project that is being developed within a company. A sentiment weighing engine 108 is described in further detail below with reference to FIG. 6. Examples of operations for determining a project phase sentiment score are described below with reference to FIG. 9. While FIGS. 6 and 9 describe determining a project phase sentiment score, similar components and/or operations may be used for determining a topical sentiment score for any topic.

In one or more embodiments, a project analysis engine 110 includes an ANN configured to determine a project management score based on a project phase sentiment score. A project analysis engine 110 obtains a project phase sentiment score from a sentiment weighing engine 108. A project analysis engine 110 is trained using time-aligned project phase sentiment scores, determined by the sentiment weighing engine 108, and project management scores, determined manually and/or using a project management application. A project analysis engine 110 is described in further detail below with reference to FIG. 7. Examples of operations for determining a project management score are described below with reference to FIG. 10. Examples of operations for training a project analysis engine 110 are described below with reference to FIG. 12.

In one or more embodiments, a sentiment analysis engine 106, sentiment weighing engine 108, and/or project analysis engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

2.1 Conversation Snippet Sentiment Analysis System

Figure 2:
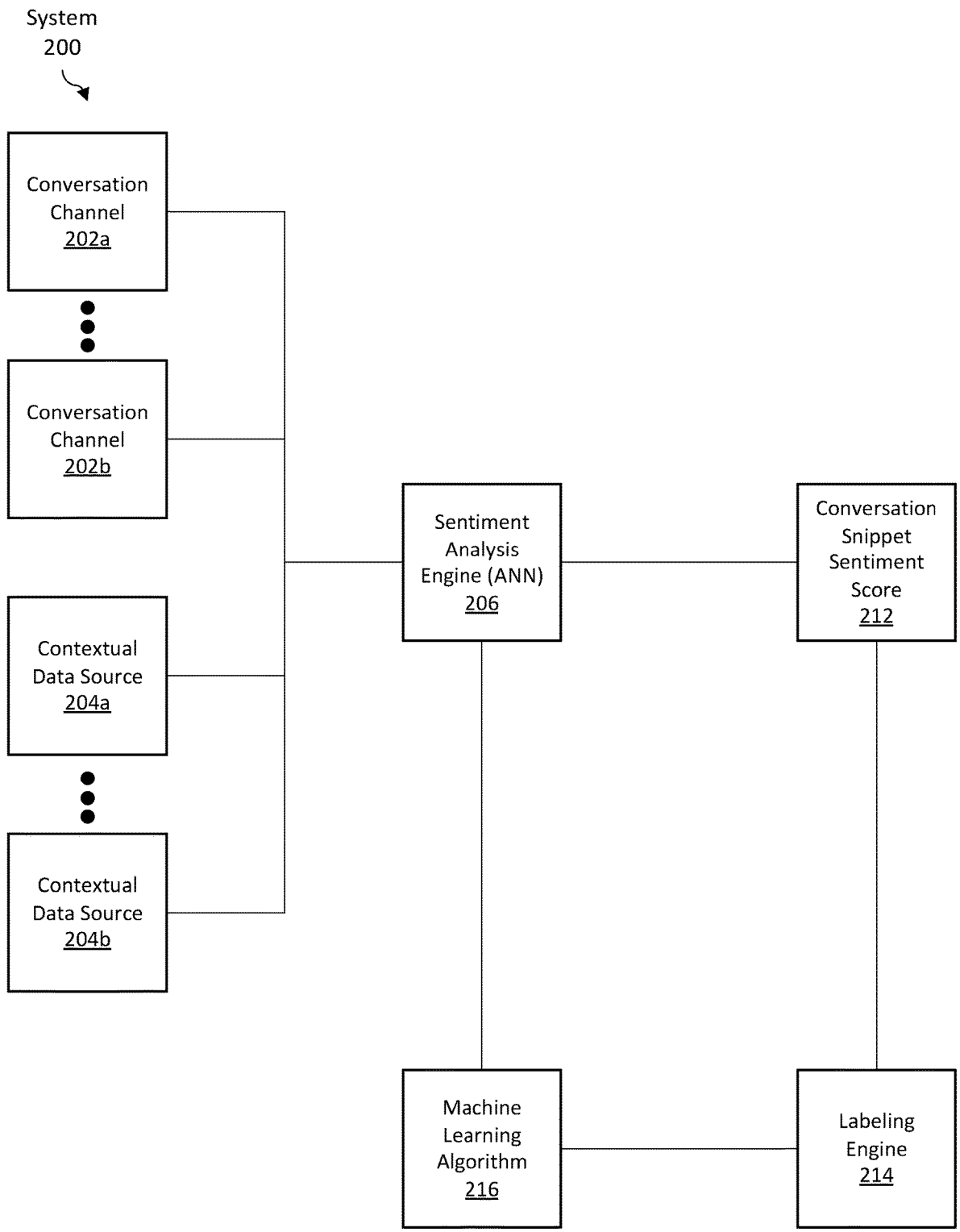
FIG. 2 illustrates a conversation snippet sentiment analysis system, in accordance with one or more embodiments.

FIG. 2 illustrates a conversation snippet sentiment analysis system, in accordance with one or more embodiments. As illustrated in FIG. 2, a system 200 includes one or more conversation channels 202a-b, one or more contextual data sources 204a-b, a sentiment analysis engine 206, a conversation snippet sentiment score 212, a labelling engine 214, and a machine learning algorithm 216. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In one or more embodiments, conversation channels 202a-b are similar to conversation channels 102a-b of FIG. 1. Contextual data sources 204a-b are similar to contextual data sources 104a-b of FIG. 1. Sentiment analysis engine 206 is similar to sentiment analysis engine 106 of FIG. 1.

As described above, a sentiment analysis engine 206 includes an ANN configured to determine a conversation snippet score 212 as a function of content of the conversation snippet and contextual attributes associated with the conversation snippet. A sentiment analysis engine 206 obtains content of one or more conversation snippets from one or more conversation channels 202a-b. A sentiment analysis engine 206 obtains contextual attributes associated with one or more conversation snippets from one or more contextual data sources 204a-b. The ANN is described in further detail below with reference to FIG. 3.

In one or more embodiments, a sentiment analysis engine 206 is trained through the use of a labeling engine 214 and a machine learning algorithm 216.

In one or more embodiments, a labeling engine 214 refers to hardware and/or software configured to label conversation snippets with labeled conversation snippet sentiment scores. In an embodiment, a labeling engine 214 includes a user interface that allows a user to manually label a conversation snippet with a labeled conversation snippet sentiment score. The user interface may present the content and/or contextual attributes of a conversation snippet. The user interface may accept user input indicating a conversation snippet sentiment score, as determined by a user after reviewing the content and/or contextual attributes. In another embodiment, a labeling engine 214 includes a rule-based system configured to label a conversation snippet with a labeled conversation snippet sentiment score. The rule-based system may include, for example, if-then logic that is applied to content and/or contextual attributes of a conversation snippet to determine a conversation snippet sentiment score.

In an embodiment, a labeling engine 214 is configured to generate an initial training set for a machine learning algorithm 216 to generate a sentiment analysis engine 206. The initial training set includes a set of conversation snippets and corresponding labeled conversation snippet sentiment scores.

In an embodiment, a labeling engine 214 is configured to update a training set for a machine learning algorithm 216 to modify a sentiment analysis engine 206. The labeling engine 214 provides feedback to the sentiment analysis engine 206 via the machine learning algorithm 216. The labeling engine 214 may label all, or only a subset of, conservation snippets analyzed by the sentiment analysis engine 206 with a labeled conversation snippet sentiment score. The training set is updated to include the conversation snippets labeled with the labeled conversation snippet sentiment scores.

In one or more embodiments, a machine learning algorithm 216 is an algorithm that can be iterated to learn a target model f that best maps a set of input variables to an output variable. The target model f may be, for example, an ANN. A machine learning algorithm 216 may include supervised components and/or unsupervised components. Various types of algorithms may be used, such as backpropagation, forward-backpropagation, recurrent neural network (RNN), long short-term memory (LSTM), encoder decoder models, linear regression, logistic regression, learning vector quantization, bagging and random forest, and/or boosting.

Figure 3:
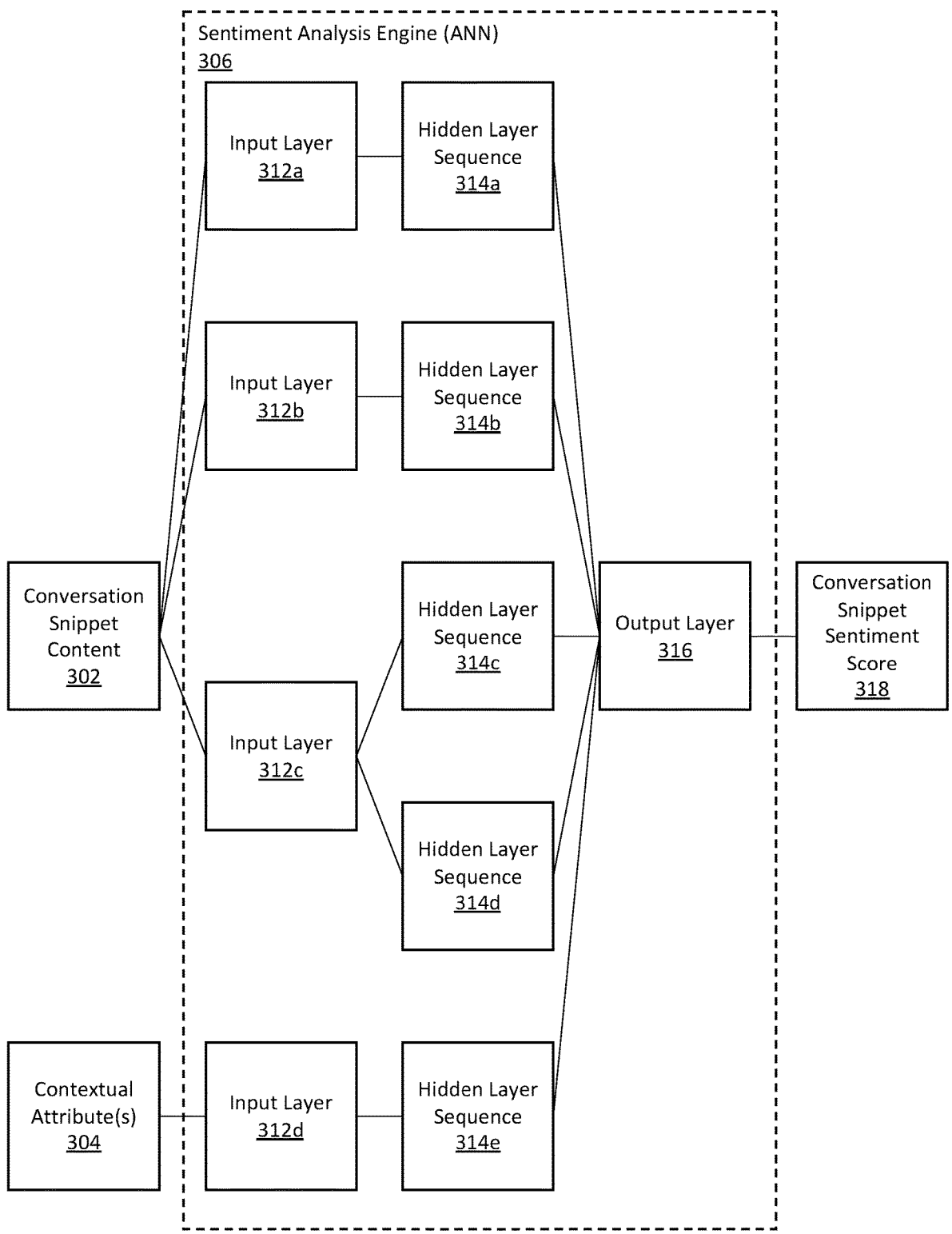
FIG. 3 illustrates a neural network incorporating contextual data in conversation snippet sentiment analysis, in accordance with one or more embodiments.

FIG. 3 illustrates a neural network incorporating contextual data in conversation snippet sentiment analysis, in accordance with one or more embodiments.

In one or more embodiments, conversation snippet content 302 may include the words, punctuation, characters, emoticons, spacing, and/or marks of a conversation snippet. Additionally or alternatively, conversation snippet content 302 may include the formatting, and/or metadata of a conversation snippet. Conversation snippet content 302 may be obtained from one or more conversation channels.

In one or more embodiments, contextual attributes 304 may include any attributes associated with a conversation snippet, as described above. Contextual attributes 304 may be obtained from contextual data sources in any format, such as YAML (YAML Ain't Markup Language), JSON (JavaScript Object Notation), XML (Extensible Markup Language), CSV (Comma-Separated Values), and OGDL (Ordered Graph Data Language). Contextual attributes 304 obtained from different contextual data sources may be in different formats. Contextual attributes 304 obtained from different contextual data sources may be transformed into a particular standardized format.

In one or more embodiments, sentiment analysis engine 306 is similar to sentiment analysis engine 206 of FIG. 2. A sentiment analysis engine 306 includes an ANN having one or more input layers 312*a-d*, one or more hidden layers 314*a-e*, and an output layer 316.

In an embodiment, an input layer (such as any of input layers 312*a-c*) is configured to prepare conversation snippet content 302 for processing by one or more hidden layers (such as any of hidden layers 314*a-d*). The input layer uses a lookup table to map each word within a set of conversation snippet content 302 into a vector. The vectors are aggregated to form a matrix, referred to herein as a "document matrix." Examples of such input layers include a word embedding layer and a lexicon embedding layer. Additional and/or alternative embedding layers may be used.

A word embedding layer and a lexicon embedding layer use different embedding models to map words into vectors. For the word embedding layer, the embedding model positions vectors in a vector space such that words that share common contexts in a corpus of text are mapped to vectors that are in close proximity to one another in the vector space. For the lexicon embedding layer, the embedding model is generated based on one or more sentiment lexicons. A sentiment lexicon is a database of lexicons (such as words and/or phrases) and corresponding sentiment scores (such as a number between −1 and 1). The embedding model converts a word into a vector that includes each sentiment score for the word, as specified by the sentiment lexicons used by the embedding model. The document matrix generated by a word embedding layer may be referred to as a "word embedding document matrix." The document matrix generated by a lexicon embedding layer may be referred to as a "lexicon embedding document matrix."

In an embodiment, an input layer (such as input layer 312*d*) is configured to prepare contextual attributes 304 for processing by one or more hidden layers (such as hidden layer 314*e*). The input layer uses a set of rules and/or mappings to convert each contextual attribute 304 into a particular value. The values are aggregated to form a vector, referred to herein as a "context vector."

A context vector may be designed in various ways. The elements of the context vector may represent any number of contextual attributes in any format and/or order. As an example, the first element of a context vector may represent whether the author of a conversation snippet is a software engineer (binary value); the second element may represent whether the author of the conversation snippet is a manager (binary value); the third element may represent whether the author of the conversation snippet is a customer (binary value). As another example, the first element of a context vector may represent the role of the author of a conversation snippet (for example, 0=software engineer, 1=manager, 2=customer); the second element may represent a current phase of the project that the conversation snippet is about (for example, 0=development, 1=testing, 2=live); the third element may represent a conversation channel used to conduct the conversation snippet (for example, 0=instant messaging system, 1=email system); the third element may represent a number of tokens within the conversation snippet content that are associated with a positive sentiment; the fourth element may represent a number of tokens within the conversation snippet content that are associated with a negative sentiment. Such a context vector may, for example, be converted into a hot-encoded context vector.

In one or more embodiments, a hidden layer sequence (such as any of hidden layer sequences 314a-e) includes a sequence of hidden layers. Various types of hidden layers may be included into a hidden layer sequence to perform various operations, as further described below with reference to FIG. 4. As illustrated, hidden layer sequences 314a-d are configured to process conversation snippet content 302. Hidden layer sequence 314e is configured to process one or more contextual attributes 304. Each of hidden layer sequences 314a-e produce respective intermediate representations, which are then passed to an output layer 316.

An output layer 316 is configured to provide an output from an ANN, based on one or more intermediate representations determined by one or more hidden layers 314a-e. An output layer is further described below with reference to FIG. 5.

Figure 4:
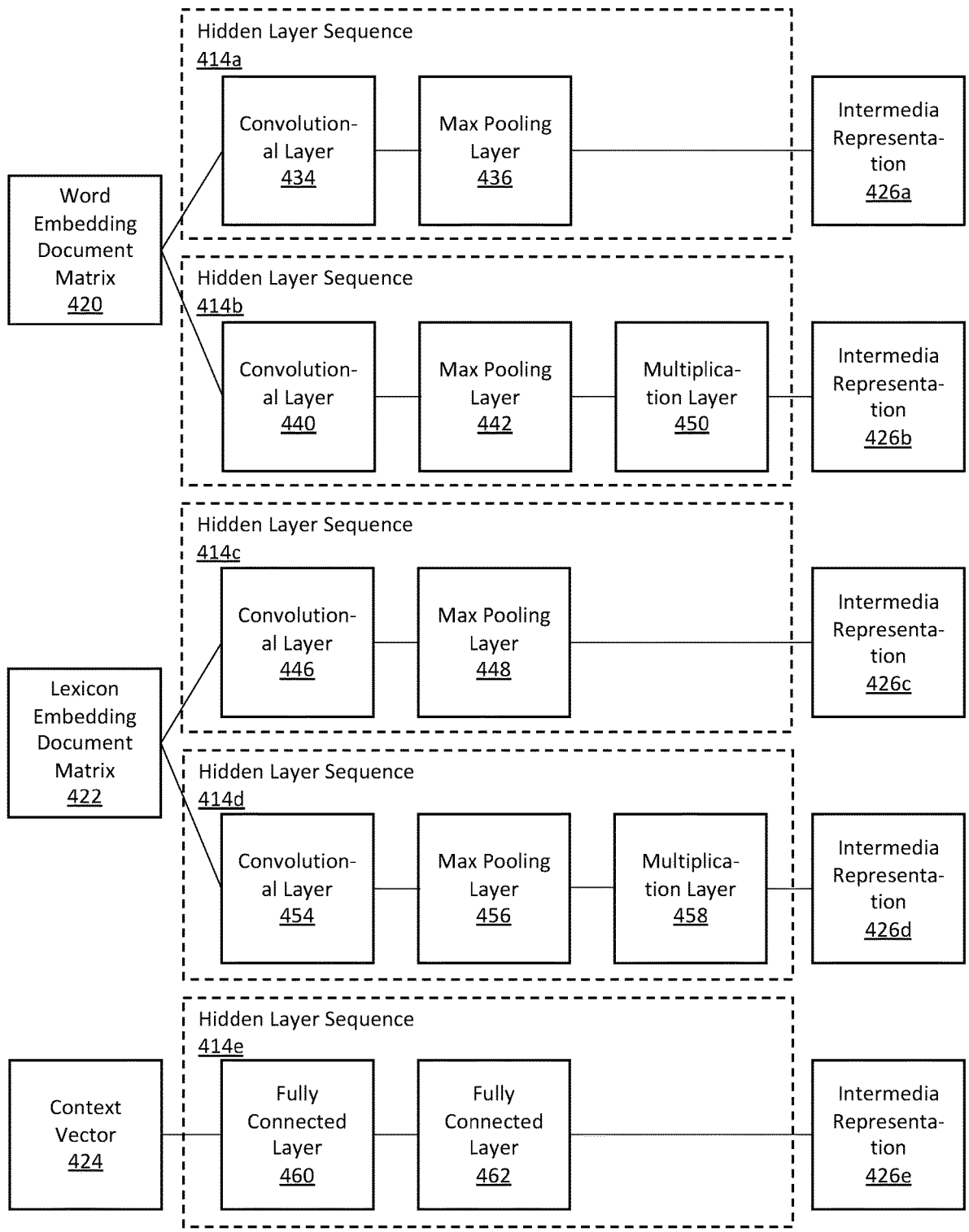
FIG. 4 illustrates hidden layer sequences of a neural network for conversation snippet sentiment analysis, in accordance with one or more embodiments.

FIG. 4 illustrates hidden layer sequences of a neural network for conversation snippet sentiment analysis, in accordance with one or more embodiments. As described above, a hidden layer sequence (such as any of hidden layer sequences 414a-e) includes a sequence of hidden layers.

In one or more embodiments, each hidden layer includes one or more neurons and/or processing nodes to perform the operations. In particular, a neuron is associated with (a) a weighted summation and (b) an activation function. The weighted summation is associated with a set of weights, respectively applicable to a set of inputs to the neuron. Where an input is a vector, the applicable weight is also a vector. A dot product is computed between each input vector and the applicable weight vector. The sum of the dot products (plus optionally a weighted bias value) may be referred to as a "state." The activation function takes the state as an input and normalizes the result (generally, a value between 0 and 1). The activation function may be, for example, a sigmoid function (such as a logistic function, or an hyperbolic tangent function), or any other function. Generally, the weights and activation function are learned using machine learning (such as backpropagation), however other methods for setting the weights and activation function may be used.

In one or more embodiments, various types of hidden layers may be included into a hidden layer sequence to perform various operations, such as a fully connected layer, a convolutional layer, a max pooling layer, and a multiplication layer.

In an embodiment, a fully connected layer (such as any of fully connected layers 460, 462) includes a set of neurons that are fully connected with a previous input layer or hidden layer in the hidden layer sequence. As an example, an input layer may produce a context vector. Each element of the context vector is connected to each neuron of a fully connected layer. Hence, each element of the context vector is an input into the weighted summation of a neuron of the fully connected layer. As another example, a particular hidden layer may include a set of neurons. Each neuron may produce a vector. Each neuron of the particular hidden layer is connected to each neuron of a fully connected layer. Hence, each vector is an input into the weighted summation of a neuron of the fully connected layer.

In an embodiment, a convolutional layer (such as any of convolutional layers 434, 440, 446, 454) includes a set of neurons, each of which is connected only with a subset of neurons from a previous input layer or hidden layer. In particular, each neuron is associated with a filter of a particular window size. A neuron of the convolutional layer is connected with neurons of a previous layer that are within the filter. The filters of a set of neurons of a convolutional layer span across the neurons of the previous layer. As an example, a previous layer may include five neurons: Neuron 1, Neuron 2, Neuron 3, Neuron 4, Neuron 5. A convolutional layer may include neurons associated with a filter of size three. Hence a first neuron of the convolutional layer may be connected to Neuron 1, Neuron 2, Neuron 3; a second neuron of the convolutional layer may be connected to Neuron 2, Neuron 3, Neuron 4; a third neuron of the convolutional layer may be connected to Neuron 3, Neuron 4, Neuron 5. The first, second, and third neurons of the convolutional layer thereby span across the neurons of the previous layer. The first, second, and third neurons together produce a vector. The vector includes three elements: one element determined based on Neuron 1, Neuron 2, Neuron 3; another element determined based on Neuron 2, Neuron 3, Neuron 4; another element determined based on Neuron 3, Neuron 4, Neuron 5.

The set of neurons of a convolutional layer may be associated with the same or different window sizes. As an example, a convolutional layer may include (a) neurons associated with a filter of size three and (b) neurons associated with a filter of size four. A previous layer may include five neurons: Neuron 1, Neuron 2, Neuron 3, Neuron 4, Neuron 5. A first, second, and third neurons of the convolutional layer may together produce a vector, as described in the example above. The vector includes three elements: one element determined based on Neuron 1, Neuron 2, Neuron 3; another element determined based on Neuron 2, Neuron 3, Neuron 4. Additionally, a fourth and fifth neuron of the convolutional layer may together produce another vector. The vector includes two elements: one element determined based on Neuron 1, Neuron 2, Neuron 3, Neuron 4; another element determined based on Neuron 2, Neuron 3, Neuron 4, Neuron 5.

The set of neurons of a convolutional layer may be associated with the same or different weights, which are learned via machine learning (such as backpropagation). As an example, a convolutional layer may include (a) neurons associated with a filter of size one and weight vector w1 (and optionally a weighted bias value), and (b) neurons associated with a filter of size one and weight vector w2 (and optionally a same or different weighted bias value). A previous layer may include three neurons: Neuron 1, Neuron 2, Neuron 3. A first neuron of the convolutional layer may be connected to Neuron 1 using w1; a second neuron of the convolutional layer may be connected to Neuron 2 using w1; a third neuron of the convolutional layer may be connected to Neuron 3 using w1; a fourth neuron of the convolutional layer may be connected to Neuron 1 using w2; a fifth neuron of the convolutional layer may be connected to Neuron 2 using w2; a sixth neuron of the convolutional layer may be connected to Neuron 3 using w2. Hence, the first, second, and third neurons (and optionally the weighted bias value) of the convolutional layer together produce a vector including at least three elements: one element determined based on Neuron 1 and w1; another element determined based on Neuron 2 and w1; another element determined based on Neuron 3 and w1. Additionally, the fourth, fifth, and sixth neurons (and optionally the other weighted bias value) of the convolutional layer together produce another vector including at least three elements: one element determined based on Neuron 1 and w2; another element determined based on Neuron 2 and w2; another element determined based on Neuron 3 and w2.

In an embodiment, a max pooling layer (such as any of max pooling layers 436, 442, 448, 456) includes a set of neurons associated with weights that are not learned via machine learning but are determined based on the values of the inputs. In particular, the input with the maximum value has a weight of one, while all other inputs have a weight of zero. As an example, a convolutional layer may produce two vectors, each including three elements. The first vector may be [0.3, 0.2, 1]; the second vector may be [0.4, 0.6, 0.5]. The convolutional layer includes a first neuron outputting the first element of the first vector; a second neuron outputting the second element of the first vector; a third neuron outputting the third element of the first vector, a fourth neuron outputting the first element of the second vector; a fifth neuron outputting the second element of the second vector; a sixth neuron outputting the third element of the second vector. Additionally, a max pooling layer may include a first neuron connected to the first, second, third neurons of the convolution layer, and a second neuron connected to the fourth, fifth, sixth neurons of the convolution layer. Since 1 (in the third element of the first vector) is the maximum value of the first vector, the first neuron applies a weight of one to the third element of the first vector, and a weight of zero to the other elements of the first vector. Since 0.6 (in the second element of the second vector) is the maximum value of the second vector, the second neuron applies a weight of one to the second element of the second vector, and a weight of zero to the other elements of the first vector. The activation function of each neuron in the max pooling layer is an identity function. Hence, the max pooling layer is configured to determine a maximum value from a set of values (such as a set of elements of a vector, or a set of elements of a row of a matrix).

In an embodiment, a multiplication layer (such as any of multiplication layers 450, 458) includes one or more processing nodes configured to multiply two values to obtain a product. As an example, a multiplication layer may multiply a matrix with a vector to obtain a new vector. In some embodiments, a multiplication layer may transpose a matrix prior to performing multiplication.

As described above, a hidden layer sequence (such as any of hidden layer sequences 414*a-e*) includes a sequence of hidden layers. The output of one hidden layer, in a hidden layer sequence, is input into a next hidden layer, in the hidden layer sequence. In some embodiments, the stacks of hidden layers in each hidden layer sequence may be repeated and concatenated to form deeper ANNs. As an example, hidden layer sequence 414*a* may include the following sequence: convolutional layer 434, max pooling layer 436, convolutional layer 434, max pooling layer 436.

As illustrated, hidden layer sequences 414*a-d* process information related to conversation snippet content. Additionally, hidden layer sequence 414*e* processes information related to contextual attributes of a conversation snippet.

In an embodiment, a hidden layer sequence 414*a* obtains a word embedding document matrix 420 from an input layer. A convolutional layer 434 includes a set of filters of varying sizes. Each filter covers a subset of vectors corresponding to a subset of words within a conversation snippet. The convolutional layer 434 applies the filters to produce a set of vectors. The max pooling layer 436 produces a vector that includes a respective maximum value from each of the set of vectors produced by the convolutional layer 434. The vector produced by the max pooling layer 436 is an intermediate representation 422*a* generated by the hidden layer sequence 414*a*. The hidden layer sequence 414*a* thereby performs "word embedding."

In an embodiment, a hidden layer sequence 414*b* obtains a word embedding document matrix 420 from an input layer.

A convolutional layer 440 includes a set of filters of size one. The set of filters may be associated with same or different weights. The convolutional layer 440 applies the filters to produce a set of vectors. The set of vectors are aggregated to form columns of a matrix, referred to herein as an "attention matrix." The max pooling layer 442 produces a vector that includes a respective maximum value from each of row of the attention matrix. The vector produced by the max pooling layer 442 may be referred to herein as an "attention vector." The multiplication layer 450 transposes the word embedding document matrix 420, and multiplies the transposed document matrix by the attention vector. The product output by the multiplication layer 450 is an intermediate representation 422*b* generated by the hidden layer sequence 414*b*. The hidden layer sequence 414*b* thereby performs "attention-based word embedding."

In an embodiment, a hidden layer sequence 414*c* is similar to the hidden layer sequence 414*a*, except that the hidden layer sequence 414*c* takes a lexicon embedding document matrix 422 as an input. The hidden layer sequence 414*c* thereby performs "lexicon embedding."

In an embodiment, a hidden layer sequence 414*d* is similar to the hidden layer sequence 414*b*, except that the hidden layer sequence 414*d* takes a lexicon embedding document matrix 422 as an input. The hidden layer sequence 414*d* thereby performs "attention-based lexicon embedding."

In an embodiment, a hidden layer sequence 414*e* obtains a context vector 424 from an input layer. The hidden layer sequence 414*e* includes one or more fully connected layers 460-462 to form a multilayer perceptron. Each fully connected layer includes a set of neurons, each of which are connected with each neuron of a previous layer. The hidden layer sequence 414*e* outputs an intermediate representation 426*e*.

Figure 5:
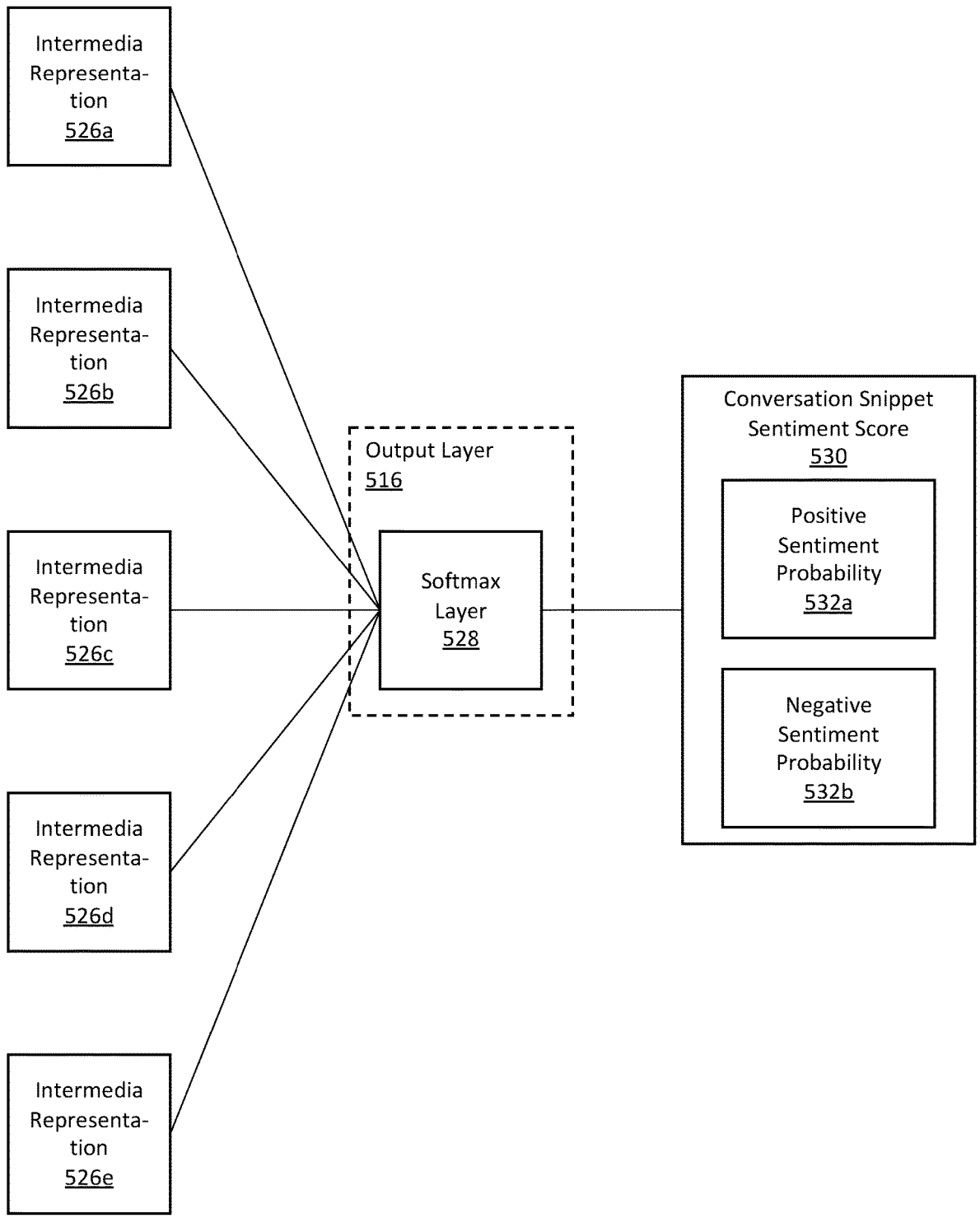
FIG. 5 illustrates an output layer of a neural network for conversation snippet sentiment analysis, in accordance with one or more embodiments.

FIG. 5 illustrates an output layer of a neural network for conversation snippet sentiment analysis, in accordance with one or more embodiments. As described above, an output layer 516 is configured to provide an output from an ANN, based on one or more intermediate representations 526*a-e* determined by one or more hidden layers. Intermediate representation 526*a* may be similar to intermediate representation 426*a* of FIG. 4, which is produced by a word embedding hidden layer sequence. Intermediate representation 526*b* may be similar to intermediate representation 426*b* of FIG. 4, which is produced by an attention-based word embedding hidden layer sequence. Intermediate representation 526*c* may be similar to intermediate representation 426*c* of FIG. 4, which is produced by a lexicon embedding hidden layer sequence. Intermediate representation 526*d* may be similar to intermediate representation 426*d* of FIG. 4, which is produced by an attention-based lexicon embedding hidden layer sequence. Intermediate representation 526*e* may be similar to intermediate representation 426*e* of FIG. 4, which is produced by a contextual data hidden layer sequence.

In one or more embodiments, an output layer 516 is a fully connected layer. Each neuron of the output layer 516 is connected to each neuron of the previous hidden layers.

In one or more embodiments, an output layer 516 includes a softmax layer 528. The softmax layer 528 includes a set of neurons that is associated with an activation function that transforms numbers into probabilities that sum to one. The softmax layer 528 outputs a vector that represents the probability distributions of a list of potential outcomes.

As illustrated, for example, a conversation snippet is potentially associated with one of two categories: positive sentiment or negative sentiment. A softmax layer 528 outputs a vector representing a conversation snippet sentiment score 530. The conversation snippet sentiment score 530 includes a positive sentiment probability 532*a* and a negative sentiment probability 532*b*. The positive sentiment probability 532*a* and the negative sentiment probability 532*b* sum to one. The larger the difference between the positive sentiment probability 532*a* and the negative sentiment probability 532*b*, the greater the confidence in the determination of positive or negative sentiment.

In other examples, more than two categories may be used. A conversation snippet is potentially associated with one of five categories: highly positive sentiment, positive sentiment, neutral, negative sentiment, or highly negative sentiment. A softmax layer outputs a vector representing a conversation snippet sentiment score, wherein the conversation snippet sentiment score includes a respective probability for each category. The probabilities sum to one.

2.2 Project Phase Sentiment Analysis System

Figure 6:
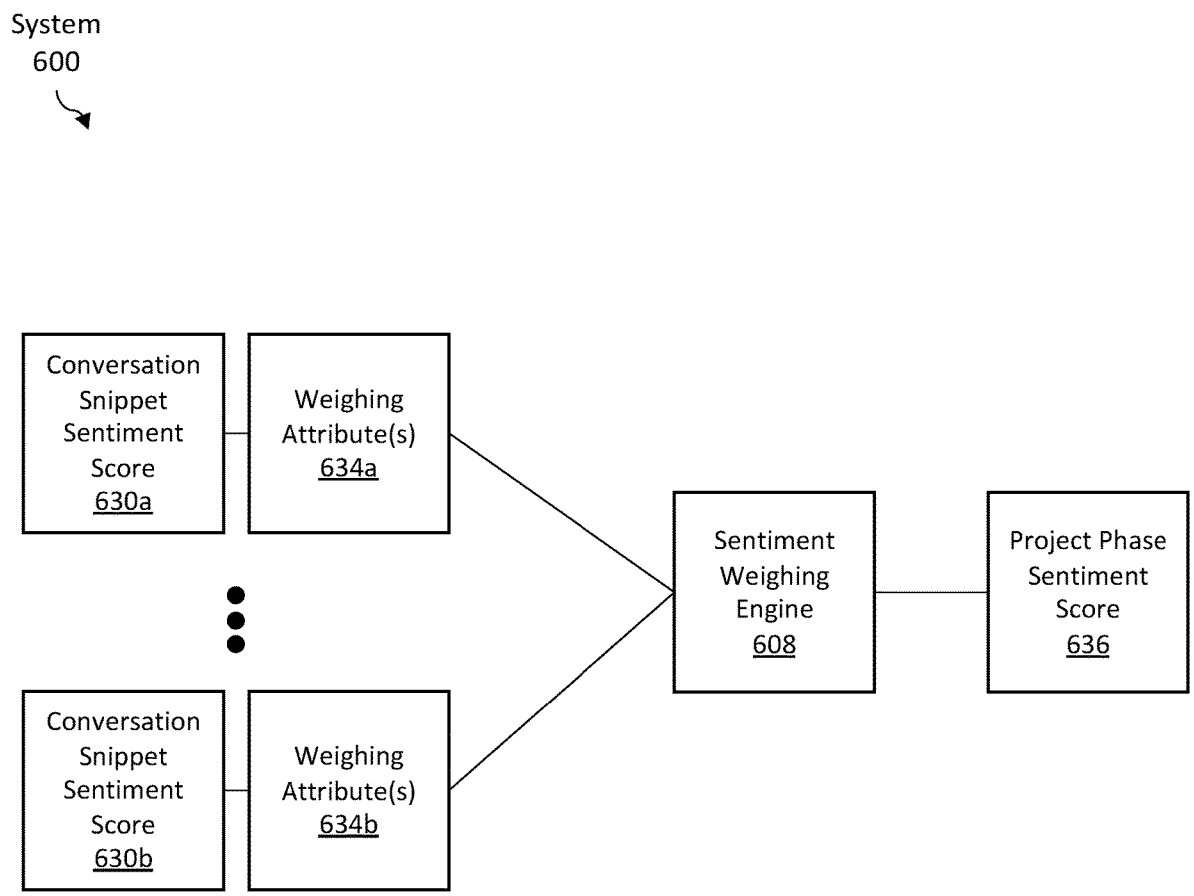
FIG. 6 illustrates a project phase sentiment analysis system, in accordance with one or more embodiments.

FIG. 6 illustrates a project phase sentiment analysis system, in accordance with one or more embodiments. As illustrated in FIG. 6, a system 600 includes one or more conversation snippet sentiment scores 630*a-b*, one or more sets of weighing attributes 634*a-b* corresponding to the conversation snippet sentiment scores 630*a-b*, a sentiment weighing engine 608, and a project phase sentiment score 636. In one or more embodiments, the system 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In one or more embodiments, a conversation snippet sentiment score and a corresponding set of weighing attributes are associated with a same conversation snippet. As an example, conversation snippet sentiment score 630*a* and weighing attributes 634*a* are associated with a same conversation snippet. Conversation snippet sentiment score 630*b* and weighing attributes 634*b* are associated with another conversation snippet.

In one or more embodiments, a conversation snippet sentiment score (such as any of conversation snippet sentiment scores 630*a-b*) is a sentiment score for a conversation snippet as determined by an ANN. The ANN may be, for example, a sentiment analysis engine as described above with reference to FIGS. 2-5. Alternatively, another ANN and/or application may be used.

Conversation snippet sentiment scores 630*a-b* that are input to a sentiment weighing engine 608 for determining a project phase sentiment score 636 (or other topical sentiment score) are sentiment scores for conversation snippets associated with a same topic and/or a same time period. As an example, conversation snippet sentiment scores that are input to a sentiment weighing engine for determining a project phase sentiment score may be sentiment scores for conversation snippets associated with a particular phase of a target project.

In one or more embodiments, a set of weighing attributes 634*a-b* includes at least a subset of contextual attributes associated with a conversation snippet. The contextual attributes may be obtained from one or more contextual data sources, as described above with reference to FIGS. 1-3. Weighing attributes 634*a-b* may be the same as or different from the contextual attributes (such as contextual attributes 304 of FIG. 3) that are used for determining a conversation snippet sentiment score. Weighing attributes 634*a-b* are used to determine a weight to be applied to a sentiment score for the conversation snippet.

Additionally or alternatively, weighing attributes 634*a-b* include a confidence level associated with a conversation snippet sentiment score. As described above, the larger the difference between a positive sentiment probability and a negative sentiment probability, the greater the confidence in the determination of positive or negative sentiment for the conversation snippet. The greater the confidence in the determination of positive or negative sentiment for the conversation snippet, the greater the weight to be applied to the sentiment score for the conversation snippet.

Additionally or alternatively, weighing attributes 634*a-b* include one or more manually-input weights for one or more particular conversation snippets and/or conversation channels. As an example, a manager may manually decide to provide a greater weight to an email system than an instant messaging system, based on his business knowledge and past experience.

In one or more embodiments, a project phase sentiment score 636 is a sentiment score for a particular phase of a target project. The particular phase may correspond to particular milestones of the target project, such as a development phase, or a testing phase. Alternatively, the particular phase may include an entire timespan from the initial designing of the target phase to a current time. The target project may be any type of project, such as a software development project, a construction project, and a manufacturing project. While FIG. 6 illustrates determining a project phase sentiment score 636, the components of FIG. 6 may be applicable to determining a topical sentiment score for any topic.

In one or more embodiments, sentiment weighing engine 608 is similar to sentiment weighing engine 108 of FIG. 1. As described above, a sentiment weighing engine 608 refers to hardware and/or software for determining a project phase sentiment score 636 (or other topical sentiment score) based on conversation snippet sentiment scores 630*a-b*. Examples of operations for determining a project phase sentiment score are described below with reference to FIG. 9.

2.3 Project Management Analysis System

Figure 7:
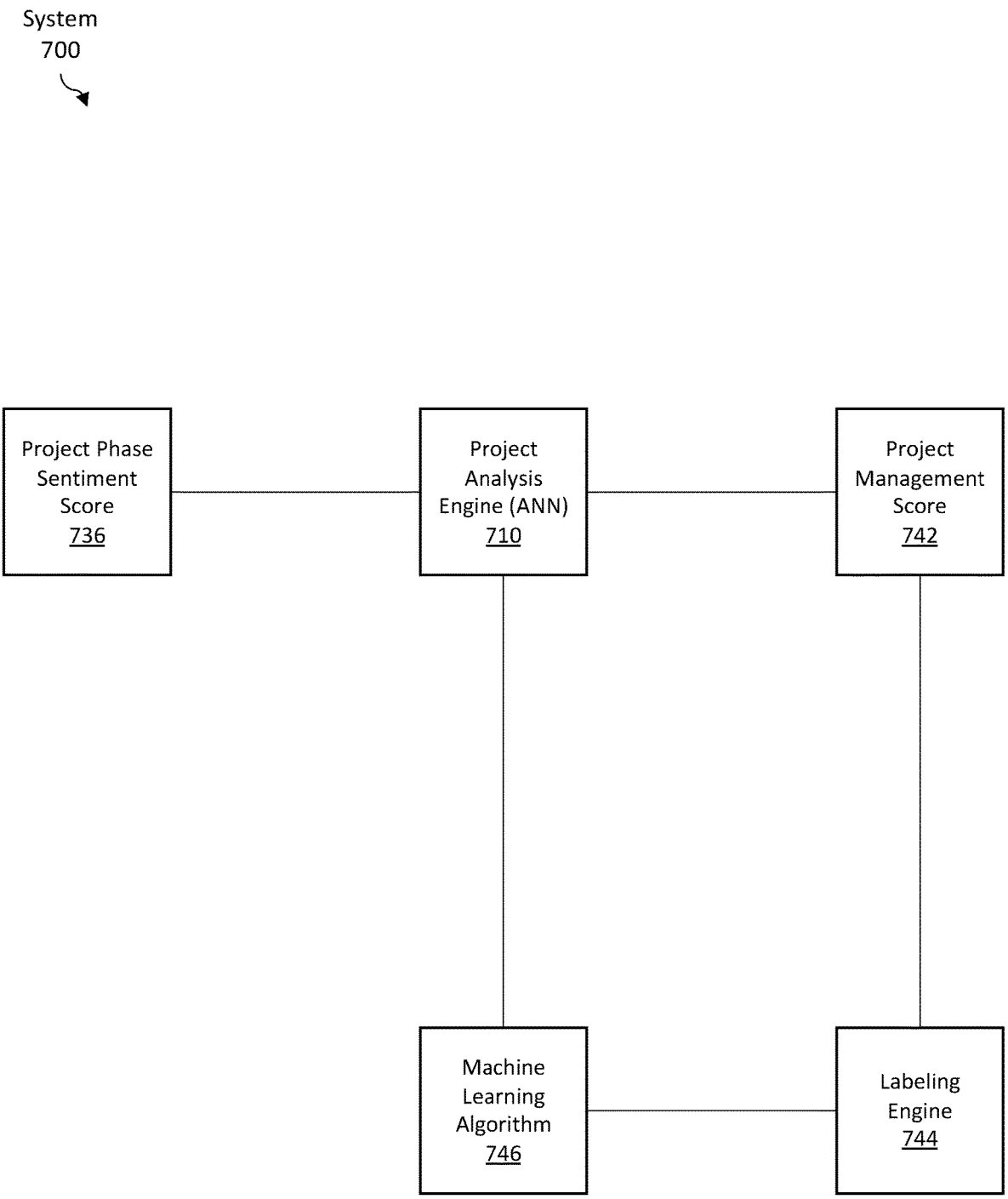
FIG. 7 illustrates a project management analysis system, in accordance with one or more embodiments.

FIG. 7 illustrates a project management analysis system, in accordance with one or more embodiments. As illustrated in FIG. 7, a system 700 includes a project phase sentiment score 736, a project analysis engine 710, a project management score 742, a labeling engine 744, and a machine learning algorithm 746. In one or more embodiments, the system 700 may include more or fewer components than the components illustrated in FIG. 7. The components illustrated in FIG. 7 may be local to or remote from each other. The components illustrated in FIG. 7 may be implemented in software and/or hardware. Each component may be distributed over multiple applications and/or machines. Multiple components may be combined into one application and/or machine. Operations described with respect to one component may instead be performed by another component.

In one or more embodiments, project phase sentiment score 736 is similar to project phase sentiment score 636 of FIG. 6. Project analysis engine 710 is similar to project analysis engine 110 of FIG. 1. As described above, a project analysis engine 710 includes an ANN configured to determine a project management score 742 based on a project phase sentiment score 736. Examples of operations for determining a project management score are described below with reference to FIG. 10.

In one or more embodiments, a project management score 742 represents how well a project is being managed. A project management application may determine a project management score 742 based on progress and/or other attributes tracked by the project management application. Additionally or alternatively, a manager may set a project management score 742 based on his own evaluation of the state and/or status of a target project.

Various actions may be performed based on a project management score 742. As an example, if a project management score is higher than a certain threshold, a manager may have confidence that the project is on track to an on-time completion. The manager may therefore continue pushing forward on sales and making commitments to customers. As another example, if a project management score is lower than a certain threshold, a manager may adjust deadlines, milestones, project scope, team members, and/or salaries to improve the project management score. After the adjustments the manager may evaluate the project again to determine whether the project management score has indeed improved, or whether further changes are required.

In one or more embodiments, a project analysis engine 710 is trained through the use of a labeling engine 744 and a machine learning algorithm 746.

In one or more embodiments, a labeling engine 744 refers to hardware and/or software configured to label projects with project management scores. In an embodiment, a labeling engine 744 includes a user interface that allows a user to manually label a project with a labeled project management score. In another embodiment, a labeling engine 744 includes a rule-based system configured to label a project with a labeled project management score. In another embodiment, a labeling engine 744 may obtain a labeled project management score for a project from a project management application from the project.

In an embodiment, a labeling engine 744 is configured to generate an initial training set for a machine learning algorithm 746 to generate a project analysis engine 710. The initial training set includes a set of project phase sentiment scores and corresponding labeled project management scores. The labeled project management scores are time-aligned with the project phase sentiment scores.

As an example, a project may include a design phase, a build phase, and a testing phase. A sentiment analysis engine may determine respective sentiment scores for each of the design phase, build phase, and testing phase of the project. Additionally, a project management application may determine labeled project management scores for the project during each of the design phase, build phase, and testing phase. Time aligning the project phase sentiment scores and the labeled project management scores may include associating the sentiment score and the labeled project management score for the design phase, associating the sentiment score and the labeled project management score for the build phase, and associating the sentiment score and the labeled project management score for the testing phase. The initial training set may indicate that the sentiment score for the design phase corresponds to the labeled project management score for the design phase, the sentiment score for the build phase corresponds to the labeled project management score for the build phase, and the sentiment score for the testing phase corresponds to the labeled project management score for the testing phase.

As another example, a sentiment analysis engine may determine respective sentiment scores for each of custom time period, such as every 2 weeks. Additionally, a project management application may determine labeled project management scores for the project during each custom time period. Time aligning the project phase sentiment scores and the labeled project management scores may include associating the sentiment score and the labeled project management score for the first time period, associating the sentiment score and the labeled project management score for the second time period, and associating the sentiment score and the labeled project management score for the third time period. The initial training set may indicate that the sentiment score for the first time period corresponds to the labeled project management score for the first time period, the sentiment score for the second time period corresponds to the labeled project management score for the second time period, and the sentiment score for the third time period corresponds to the labeled project management score for the third time period.

In an embodiment, a labeling engine 744 is configured to update a training set for a machine learning algorithm 746 to modify a project analysis engine 710. The labeling engine 744 provides feedback to the project analysis engine 710 via the machine learning algorithm 746. The labeling engine 744 may label all, or only a subset of, projects analyzed by the sentiment analysis engine 710 with a labeled project management score. As described above, the project sentiment scores are time-aligned with the labeled project management scores. The training set is updated to include the projects labeled with the labeled project management scores.

In one or more embodiments, a machine learning algorithm 746 is an algorithm that can be iterated to learn a target model f that best maps a set of input variables to an output variable. The target model f may be, for example, an ANN. A machine learning algorithm 114 may include supervised components and/or unsupervised components. Various types of algorithms may be used, such as backpropagation, forward-backpropagation, recurrent neural network (RNN), long short-term memory (LSTM), encoder decoder models, linear regression, logistic regression, learning vector quantization, bagging and random forest, and/or boosting.

3. Determining a Conversation Snippet Sentiment Score

Figure 8:
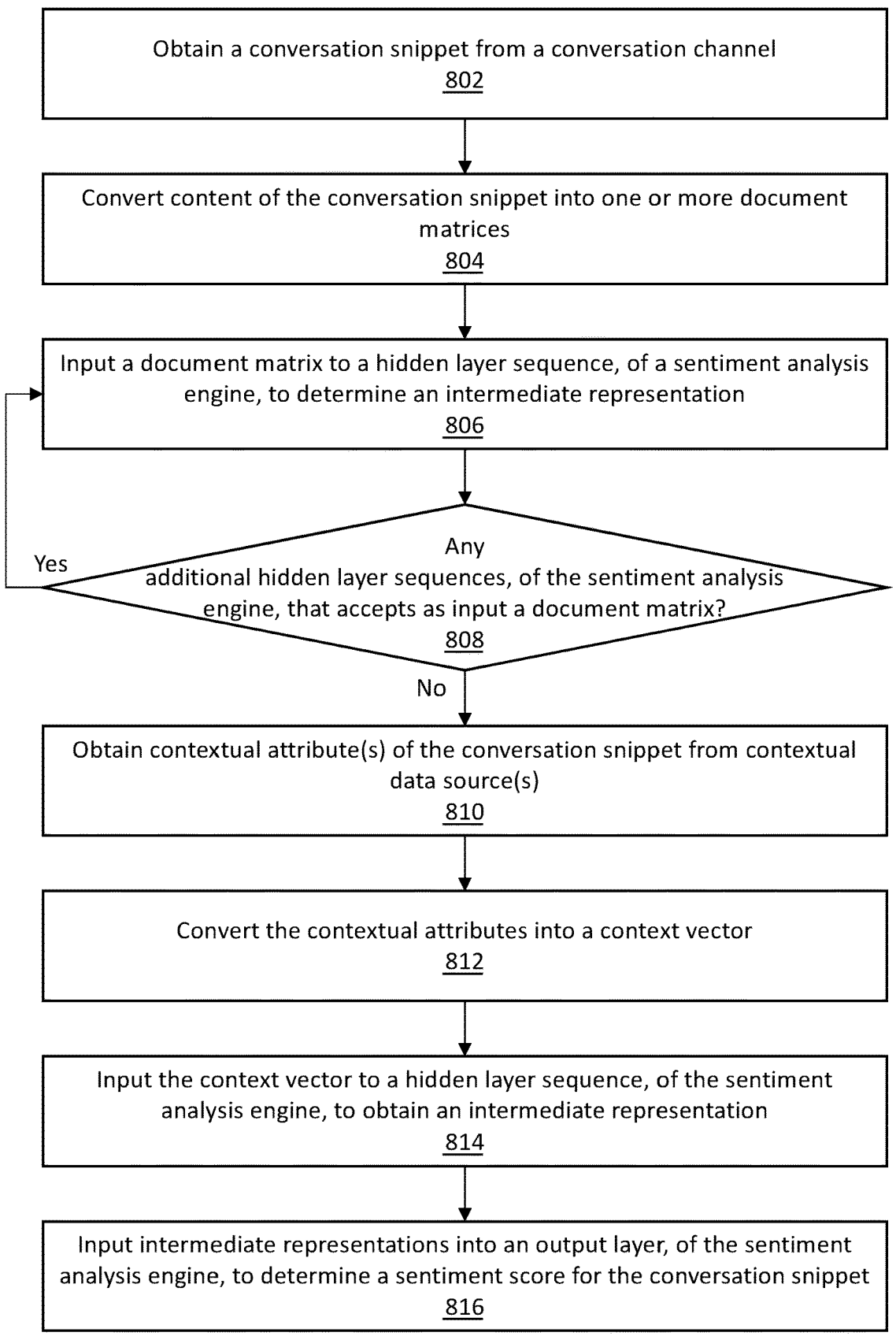
FIG. 8 illustrates an example set of operations for determining a conversation snippet sentiment score, in accordance with one or more embodiments.

FIG. 8 illustrates an example set of operations for determining a conversation snippet sentiment score, in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments.

One or more embodiments include obtaining a conversation snippet from a conversation channel (Operation 802). A sentiment analysis engine obtains a conversation snippet from a conversation channel. The sentiment analysis engine may scrape the conversation channel. Additionally or alternatively, the conversation channel may share and/or transmit the conversation snippet to the sentiment analysis engine.

One or more embodiments include converting content of the conversation snippet into one or more document matrices (Operation 804). The sentiment analysis engine converts content of the conversation snippet into one or more document matrices.

In an embodiment, the sentiment analysis engine initially converts words of a conversation snippet into a set of indices or encodings. The sentiment analysis engine may use a lookup table to convert each word in the conversation snippet into a respective index in the lookup table. Additionally or alternatively, the sentiment analysis engine may convert each word in the conversation snippet into a one-hot encoding value. Each word in a database may correspond to a unique one-hot encoding value. As an example, a database may include the words, apple, banana, orange, pear. The database may include one-hot encodings for the words as follows:

TABLE 1

| Word | One-Hot Encoding Value |
|---|---|
| Apple | 1000 |
| Banana | 0100 |
| Orange | 0010 |
| Pear | 0001 |

In an embodiment, the sentiment analysis engine generates a document matrix based on the set of indices or encodings. The sentiment analysis engine may determine a candidate set of conversions to be performed, such as word embedding and lexicon embedding. The sentiment analysis engine selects one of the candidate set of conversions. The sentiment analysis engine selects an embedding model based on the selected conversion. The embedding model may be pre-trained (such as Word2Vec, provided by Google, or Glove, provided by Stanford NLP Group) and/or may be learned via training using another neural network. The sentiment analysis utilizes a lookup model associated with the selected embedding model to convert the set of indices or encodings into embedding vectors. The embedding vectors together form a document matrix. The sentiment analysis engine may iterate the above embedding process for each of the candidate set of conversions. Hence, the sentiment analysis engine may generate a word embedding document matrix and/or a lexicon embedding document matrix.

In an embodiment, the sentiment analysis engine does not necessarily convert words of a conversation snippet into a set of indices or encodings. The sentiment analysis engine may directly analyze the words of the conversation snippet and embed the words using an embedding model. The lookup table for the embedding model may directly map the words to the corresponding embedding vector. As described above, the sentiment analysis engine may generate a word embedding document matrix and/or a lexicon embedding document matrix.

One or more embodiments include inputting the document matrix to a hidden layer sequence, of a sentiment analysis engine, to determine an intermediate representation (Operation 806). The sentiment analysis engine identifies a set of hidden layer sequences. The sentiment analysis engine identifies an appropriate hidden layer sequence to be applied to a document matrix of a certain type. The sentiment analysis engine processes the document matrix according to the hidden layer sequence. The sentiment analysis engine thereby determines an intermediate representation using the hidden layer sequence.

As an example, a sentiment analysis engine may obtain a word embedding document matrix. The sentiment analysis engine may determine that a word embedding hidden layer sequence and an attention-based word embedding hidden layer sequence are appropriate for processing the word embedding document matrix. The sentiment analysis engine may process the word embedding document matrix using all, or only a subset, of the appropriate hidden layer sequences. Based on the word embedding hidden layer sequence, the sentiment analysis engine may process the word embedding document matrix through a convolutional layer and a max pooling layer, as described above with reference to hidden layer sequence 414a of FIG. 4. Based on the attention-based word embedding hidden layer sequence, the sentiment analysis engine may process the word embedding document matrix through a convolutional layer, a max pooling layer, and a multiplication layer, as described above with reference to hidden layer sequence 414b of FIG. 4.

Continuing the example, the sentiment analysis engine may additionally obtain a lexicon embedding document matrix. The sentiment analysis engine may determine that a lexicon embedding hidden layer sequence and an attention-based lexicon embedding hidden layer sequence are appropriate for processing the lexicon embedding document matrix. The sentiment analysis engine may process the lexicon embedding document matrix using all, or only a subset, of the appropriate hidden layer sequences. Based on the lexicon embedding hidden layer sequence, the sentiment analysis engine may process the lexicon embedding document matrix through a convolutional layer and a max pooling layer, as described above with reference to hidden layer sequence 414c of FIG. 4. Based on the attention-based lexicon embedding hidden layer sequence, the sentiment analysis engine may process the lexicon embedding document matrix through a convolutional layer, a max pooling layer, and a multiplication layer, as described above with reference to hidden layer sequence 414d of FIG. 4.

One or more embodiments include determining whether there are any additional hidden layer sequences, of the sentiment analysis engine, that accepts as input a document matrix (Operation 808). The sentiment analysis engine determines whether there are any additional hidden layer sequences appropriate for processing a document matrix that have not yet been applied. If yes, the sentiment analysis engine iterates Operation 806 using the additional layer sequence. Hence, the sentiment analysis engine processes each document matrix using each of the appropriate hidden layer sequences. The sentiment analysis engine obtains an intermediate representation from each of the hidden layer sequences.

One or more embodiments include obtaining one or more contextual attributes of the conversation snippet from one or more contextual data sources (Operation 810). The sentiment analysis engine obtains contextual attributes of the conversation snippet from one or more contextual data sources.

In an embodiment, the sentiment analysis engine obtains attributes related to a user participating in the conversation snippet. The sentiment analysis engine identifies a user identifier of a user participating in the conversation snippet. The sentiment analysis engine may, for example, identify an email address of a sender and/or recipient of an email, a user identifier of an author of an instant message, a user identifier of an employee reporting a bug in a debugging application.

The sentiment analysis engine looks up information about the user using a human resources database, a social media platform, and/or publicly available databases. The sentiment analysis engine determines attributes related to the user, examples of which are provided above in Section 2, entitled "Overall Sentiment Analysis System Architecture."

In an embodiment, the sentiment analysis engine obtains attributes related to a particular conversation channel on which a conversation snippet is conducted and/or other available conversation channels. The sentiment analysis engine identifies the particular conversational channel on which the conversation snippet is conducted. The sentiment analysis engine may identify other available conversation channels. As an example, a company may offer an instant messaging system, an email system, and a project organization application for employees to communicate and collaborate with each other. A sentiment analysis engine may identify the instant messaging system, email system, and project organization application as available conversation channels.

The sentiment analysis engine analyzes the conversation snippets associated with each conversational channel. The sentiment analysis engine determines attributes related to one or more conversation channels, examples of which are provided above in Section 2, entitled "Overall Sentiment Analysis System Architecture."

In an embodiment, the sentiment analysis engine obtains attributes related to the environment associated with a conversation snippet. As an example, a sentiment analysis engine may identify a time or day during which a conversation snippet is conducted.

In an embodiment, the sentiment analysis engine obtains attributes related to the content of a conversation snippet. The sentiment analysis engine analyzes the content for various statistics and/or other attributes. Examples of attributes related to the content of a conversation snippet are provided above in Section 2, entitled "Overall Sentiment Analysis System Architecture."

Additional and/or alternative contextual attributes from additional and/or alternative contextual data sources may also be used.

In an embodiment, the sentiment analysis engine standardizes the contextual attributes obtained from the contextual data sources into a single data format. Any data format may be used, such as YAML, JSON, XML. The sentiment analysis engine aggregates the contextual attributes into a data set.

One or more embodiments include converting the contextual attributes into a context vector (Operation 812). The sentiment analysis engine converts the contextual attributes into a context vector. The sentiment analysis engine uses a set of rules and/or mappings to perform the conversion.

As an example, a context vector v may be organized as follows:
v[0]=whether an author of a conversation snippet is a software engineer (binary value);
v[1]=whether the author of the conversation snippet is a manager (binary value);
v[2]=whether the author of the conversation snippet is a customer (binary value).

Based on a set of contextual attributes, the sentiment analysis engine may determine that an author of a conversation snippet is a manager. The sentiment analysis engine may convert the contextual attributes into a context vector v, [010].

One or more embodiments include inputting the context vector to a hidden layer sequence, of the sentiment analysis engine, to determine an intermediate representation (Operation 814). The sentiment analysis engine identifies a set of hidden layer sequences. The sentiment analysis engine identifies an appropriate hidden layer sequence to be applied to the context vector. The sentiment analysis engine processes the document matrix according to the hidden layer sequence. The sentiment analysis engine thereby determines an intermediate representation using the hidden layer sequence.

As an example, a sentiment analysis engine may obtain a context vector. The sentiment analysis engine may determine that a contextual hidden layer sequence is appropriate for processing the context vector. Based on the contextual hidden layer sequence, the sentiment analysis engine may process the context vector through one or more fully connected layers, as described above with reference to hidden layer sequence 414e of FIG. 4.

One or more embodiments include inputting the intermediate representations into an output layer, of the sentiment analysis engine, to determine a sentiment score for the conversation snippet (Operation 816). The sentiment analysis engine obtains an intermediate representation from each iteration of processing a document matrix through a hidden layer sequence. Additionally, the sentiment analysis engine obtains an intermediate representation from processing the context vector through a hidden layer sequence. The sentiment analysis engine inputs the intermediate representations into an output layer. The output layer may be, for example, a softmax layer, as described above with reference to softmax layer 528 of FIG. 5. Hence, the sentiment analysis engine obtains a conversation snippet sentiment score. The conversation snippet sentiment score may include probabilities for potential outcomes, such as positive sentiment probability and negative sentiment probability.

4. Determining a Project Phase Sentiment Score

Figure 9:
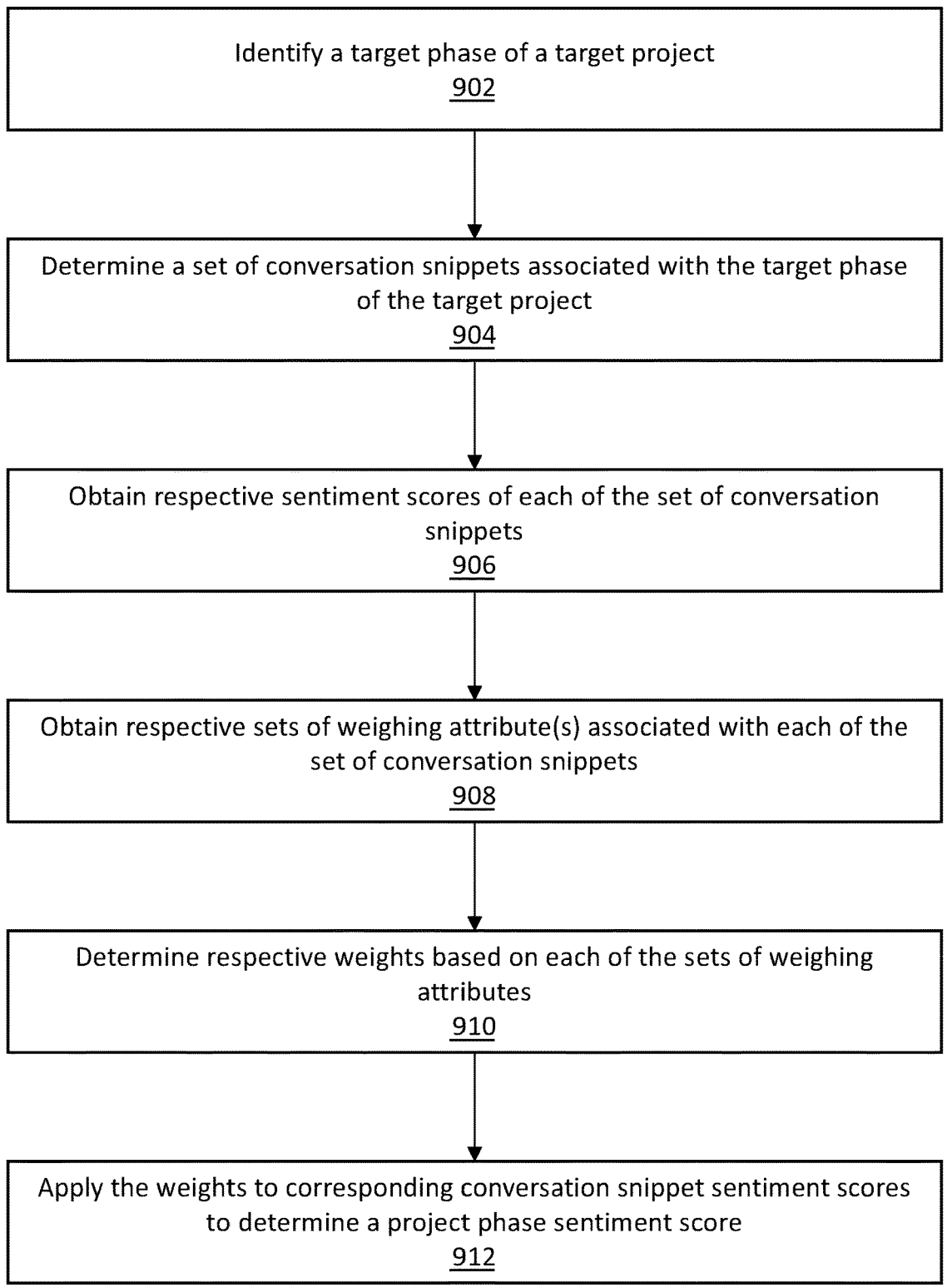
FIG. 9 illustrates an example set of operations for determining a project phase sentiment score, in accordance with one or more embodiments.

FIG. 9 illustrates an example set of operations for determining a project phase sentiment score, in accordance with one or more embodiments. One or more operations illustrated in FIG. 9 may be modified, rearranged, or omitted all together. Accordingly, the particular sequence of operations illustrated in FIG. 9 should not be construed as limiting the scope of one or more embodiments. While FIG. 9 describes determining a project phase sentiment score, similar operations may be used for determining a topical sentiment score for any topic.

One or more embodiments include identifying a target phase of a target project (Operation 902). A sentiment weighing engine identifies a target phase of a target project for which a sentiment score is desired. The sentiment weighing engine identifies start and end dates of the target phase. The sentiment weighing engine identifies an identifier, code, and/or name associated with the target project.

In an embodiment, determination of a sentiment score for a specific collaborator group during a target phase of a target project may be desired. Hence, the sentiment weighing engine may also identify the specific collaborator group. The sentiment weighing engine may identify an identifier, code, and/or name of the collaborator group. The sentiment weighing engine may identify members of the collaborator group.

One or more embodiments include determining a set of conversation snippets associated with the target phase of the target project (Operation 904). The sentiment weighing engine determines a set of conversation snippets associated with the target phase of the target project.

In an embodiment, the sentiment weighing engine utilizes metadata associated with a conversation snippet to determine whether the conversation snippet is associated with the target project. As an example, an email may include an email header that specifies the project that the email is about. As another example, an instant messaging platform may include various messaging groups, wherein each messaging group is associated with a respective project. The messaging group may be used to determine which project a particular instant message is about. As another example, an instant message may include a hashtag that identifies the project that the instant message is about.

In an embodiment, the sentiment weighing engine applies natural language processing to a conversation snippet to determine whether the conversation snippet is associated with the target project. The sentiment weighing engine may analyze the content of the conversation snippet to determine whether an identifier of the target project was mentioned. The sentiment weighing engine may analyze the content of the conversation snippet to determine whether an identifier of the target project was mentioned. The sentiment weighing engine may analyze the content to determine whether an attribute of the target project (such as a feature being developed by the target project, or a particular programming language or operation used in the target project) was mentioned.

In an embodiment, the sentiment weighing engine analyzes users participating in the conversation snippet. The sentiment weighing engine determines whether the users match with the team members of the target project. If the users match with the team members of the target project, then the sentiment weighing engine identifies the conversation snippet as being associated with the target project. Alternatively, if a sentiment score for a specific collaborator group of the target project is desired, then the sentiment weighing engine determines whether the users participating in the conversation snippet are within the collaborator group. If the users are within the collaborator group, then the sentiment weighing engine identifies the conversation snippet as being associated with the target project and the specific collaborator group.

In an embodiment, the sentiment weighing engine determines a time at which the conversation snippet was transmitted and/or read by a user. The sentiment weighing engine compares the time with a time period associated with the target phase of the target project. If the time at which the conversation snippet was transmitted and/or read falls within the time period associated with the target phase, then the sentiment weighing engine identifies the conversation snippet as being associated with the target phase.

One or more embodiments include obtaining respective sentiment scores of each of the set of conversation snippets (Operation 906). The sentiment weighing engine obtains conversation snippet sentiment score for each conversation snippet identified at Operation 904. The sentiment weighing engine may obtain the conversation snippet sentiment scores from a sentiment analysis engine and/or another ANN or application.

One or more embodiments include obtaining respective sets of one or more weighing attributes associated with each of the set of conversation snippets (Operation 908). The sentiment weighing engine obtains respective sets of weighing attributes associated with each conversation snippet identified at Operation 904. The weighing attributes may be all, or a subset of, the contextual attributes obtained at Operation 810 of FIG. 8. The sentiment weighing engine may obtain additional and/or alternative attributes than the contextual attributes obtained at Operation 810 of FIG. 8.

In an embodiment, the sentiment weighing engine determines respective confidence levels associated with the conversation snippet sentiment scores. The sentiment weighing engine determines a difference between the probabilities indicated for the potential outcomes by a conversation snippet sentiment score. Based on the difference, the sentiment weighing engine determines a confidence level associated with the conversation snippet sentiment score. As an example, a sentiment weighing engine may use a set of mappings and/or functions to map a difference to a confidence level.

One or more embodiments include determining respective weights based on each of the sets of weighing attributes (Operation 910). The sentiment weighing engine determines weights to be applied to the conversation snippet sentiment scores based on the sets of weighing attributes.

The sentiment weighing engine may utilize a lookup table, a set of rules, a function, and/or an ANN to determine a particular weight based on a particular set of weighing attributes.

The sentiment weighing engine may determine a greater weight for a conversation snippet if the conversation snippet is conducted on a conversation channel that is less commonly used. As an example, a company may provide an instant messaging system and an email system. Team members of a target project may mainly use the instant messaging system, rather than the email system, to communicate about the target project. A sentiment weighing engine identify a particular conversation snippet conducted on the instant messaging system that is about the target project. The sentiment weighing engine may identify a set of conversation snippets associated with the target project. The sentiment weighing engine may determine a proportion of the set of conversation snippets that are conducted on the instant messaging system—for example, 80% of the conversation snippets are conducted using the instant messaging system, and 20% of the conversation snippets are conducted using the email system. Hence, lesser weights may be applied to sentiment scores for conversation snippets conducted on the instant messaging system, and greater weights may be applied to sentiment scores for conversation snippets conducted on the email system. Therefore, the sentiment weighing engine may determine a lesser weight to be applied to the sentiment score for the particular conversation snippet.

As another example, a company may provide three conversation channels for employees to communicate about a target project. A sentiment weighing engine may identify a set of conversation snippets about the target project. The sentiment weighing engine may determine a distribution of the set of conversation snippets across the three conversational channels. If the distribution is relatively equal, the weights corresponding to the conversation snippets over the conversation channels may be similar If a first conversational channel has a higher conversation count than a second conversational channel, and the second conversational channel has a higher conversation count than a third conversational channel, then a first weight corresponding to conversation snippets conducted over the first conversational channel may be the smallest, a second weight corresponding to conversation snippets conducted over the second conversational channel may be in the middle, and a third weight corresponding to conversation snippets conducted over the third conversational channel may be the greatest.

As another example, a sentiment weighing engine may identify a set of conversation snippets about a target project. The sentiment weighing engine may determine a respective number of users participating in the set of conversation snippets on each conversation channel. If the numbers of users for the conversational channels are relatively equal, the weights corresponding to the conversation snippets over the conversation channels may be similar Otherwise, lesser weights may be provided for conversation snippets conducted on conversational channels with less users, and greater weights may be provided for conversation snippets conducted on conversational channels with more users.

As another example, a sentiment weighing engine may identify a set of conversation snippets about a target project. The sentiment weighing engine may determine a respective role of users participating in the set of conversation snippets on each conversation channel. Lesser weights may be provided for conversation snippets conducted on conversational channels with users lower on the organizational hierarchy, and greater weights may be provided for conversation snippets conducted on conversational channels with users higher on the organizational hierarchy. Additionally or alternatively, lesser weights may be provided for conversation snippets conducted on conversational channels with a lower frequency of communication from users higher on the organizational hierarchy, and greater weights may be provided for conversation snippets conducted on conversational channels with a higher frequency of communication from users higher on the organizational hierarchy.

As another example, a sentiment weighing engine may identify a set of conversation snippets about a target project. The sentiment weighing engine may determine a respective confidence level associated with a sentiment score for each conversation snippet. The greater the confidence in the determination of positive or negative sentiment for the conversation snippet, the greater the weight to be applied to the sentiment score for the conversation snippet.

One or more embodiments include applying the weights to corresponding conversation snippet sentiment scores to determine a project phase sentiment score (Operation 912). The sentiment weighing engine applies the weights to the corresponding conversation snippet sentiment scores. The sentiment weighing engine determines a first weight based on weighing attributes for a first conversation snippet. The sentiment weighing engine applies the first weight to the sentiment score for the first conversation snippet Similarly, the sentiment weighing engine determines a second weight based on weighing attributes for a second conversation snippet. The sentiment weighing engine applies the second weight to the sentiment score for the second conversation snippet.

The sentiment weighing engine aggregates the weighted conversation snippet sentiment scores to determine a project sentiment score. Applying a weight to a conversation snippet sentiment score may involve, for example, multiplying the conversation snippet sentiment score by the weight. Aggregating the weighted conversation snippet sentiment scores may involve, for example, summing up the weighted conversation snippet sentiment scores. Additional and/or alternative methods for aggregating weighted conversation snippet sentiment scores may be used.

5. Determining a Project Management Score

Figure 10:
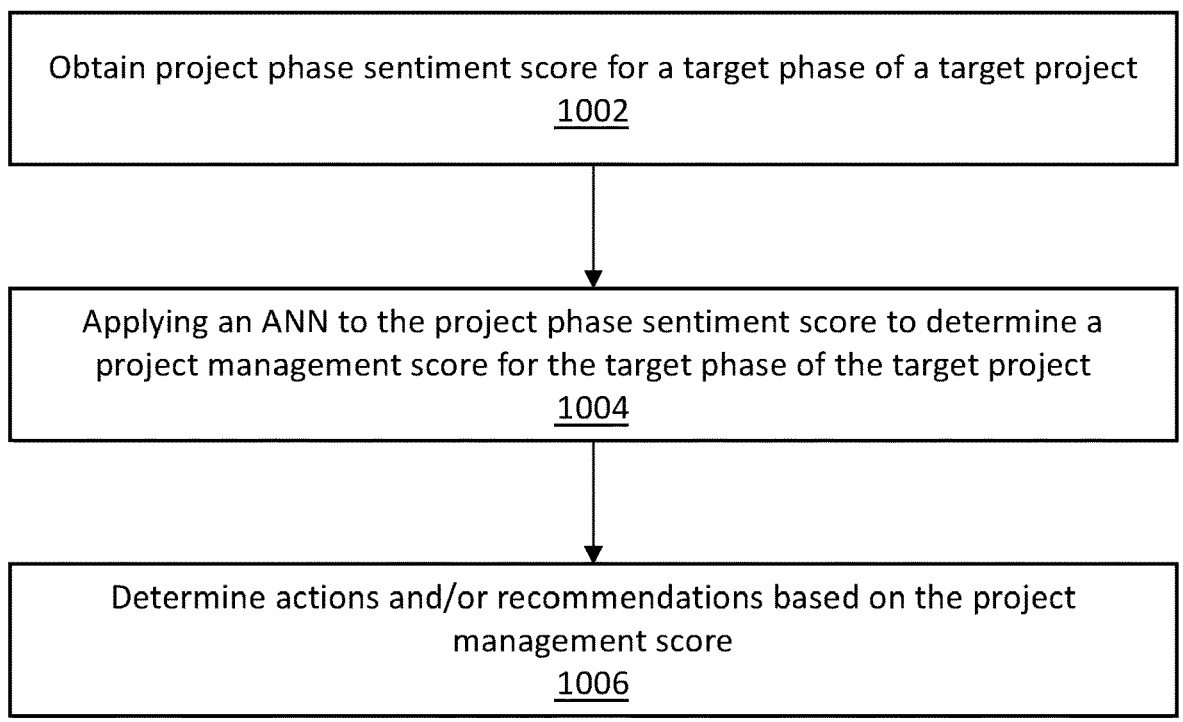
FIG. 10 illustrates an example set of operations for determining a project management score, in accordance with one or more embodiments.

FIG. 10 illustrates an example set of operations for determining a project management score, in accordance with one or more embodiments. One or more operations illustrated in FIG. 10 may be modified, rearranged, or omitted all together. Accordingly, the particular sequence of operations illustrated in FIG. 10 should not be construed as limiting the scope of one or more embodiments.

One or more embodiments include obtaining a project phase sentiment score for a target phase of a target project (Operation 1002). A project analysis engine obtains a project phase sentiment score for a target phase of a target project. The project analysis engine may obtain the project phase sentiment score from a sentiment weighing engine and/or another application.

One or more embodiments include applying an ANN to the project phase sentiment score to determine a project management score for the target phase of the target project (Operation 1004). The project analysis engine processes the project phase sentiment score through one or more input layers, one or more hidden layers, and an output layer of an ANN. The output of the output layer is the project management score.

One or more embodiments include determining actions and/or recommendations based on the project management score (Operation 1006). The project analysis engine determines actions and/or recommendations based on the project management score. The project analysis engine may automatically perform the actions. Additionally or alternatively, the project analysis engine may provide recommendations to the appropriate users.

As an example, a project analysis engine may automatically postpone an upcoming milestone deadline if a project management score is below a threshold value. As another example, a project analysis engine may transmit an alert to a manager if a project management score is below a threshold value. The alert may recommend that the manager arrange a full-team meeting within the next two days to discuss the target project.

Figure 11:
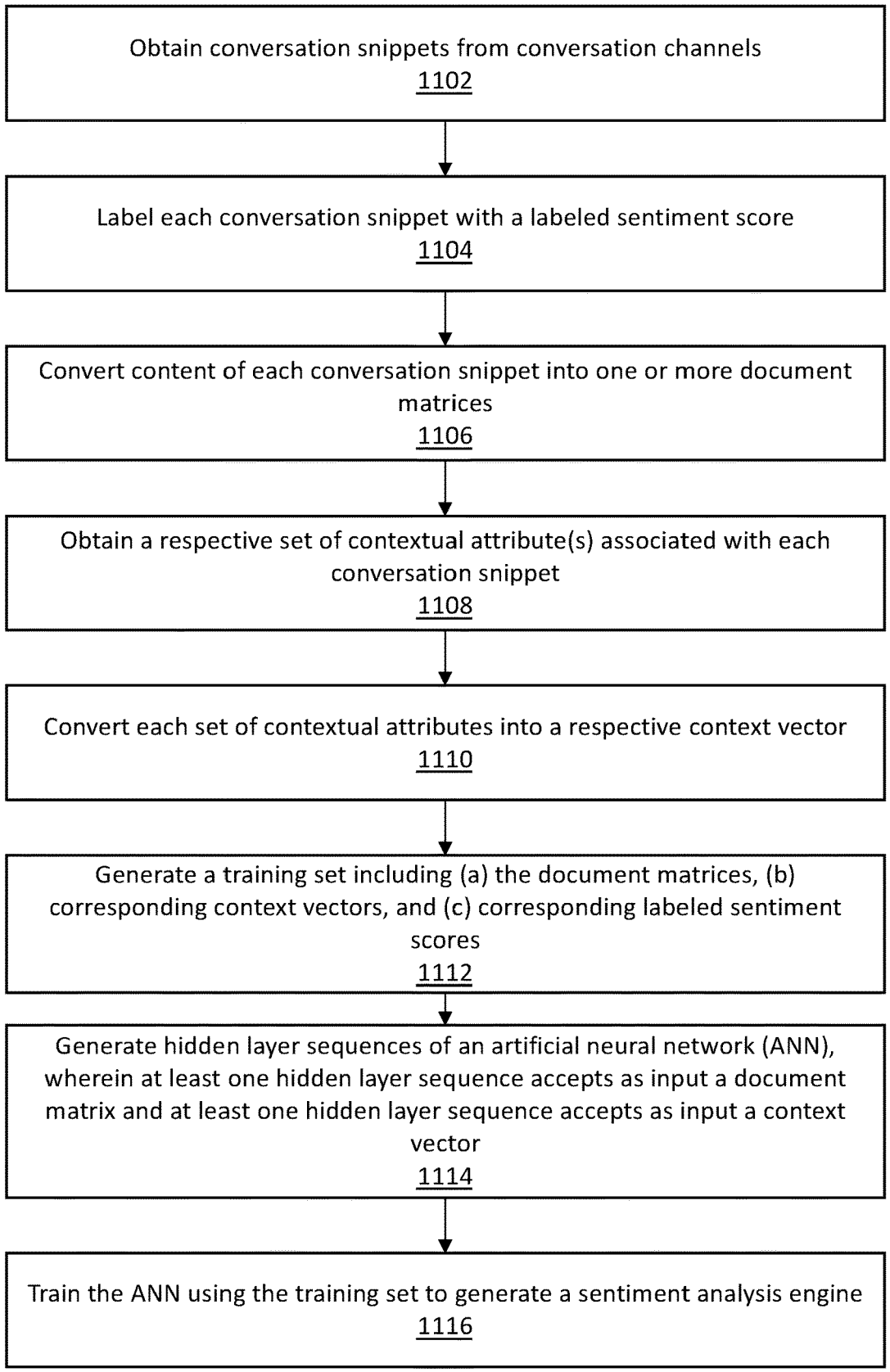
FIG. 11 illustrates an example set of operations for training a neural network for determining conversation snippet sentiment scores, in accordance with one or more embodiments.

6. Training a Neural Network for Determining Conversation Snippet Sentiment Scores FIG. 11 illustrates an example set of operations for training a neural network for determining conversation snippet sentiment scores, in accordance with one or more embodiments. One or more operations illustrated in FIG. 11 may be modified, rearranged, or omitted all together. Accordingly, the particular sequence of operations illustrated in FIG. 11 should not be construed as limiting the scope of one or more embodiments.

One or more embodiments include obtaining conversation snippets from conversation channels (Operation 1102). A machine learning system obtains conversation snippets from conversation channels. Examples of operations for obtaining a conversation snippet from a conversation channel are described above with reference to Operation 802 of FIG. 8.

One or more embodiments include labeling each conversation snippet with a labeled sentiment score (Operation 1104). A labeling engine of the machine learning system labels each conversation snippet with a labeled sentiment score.

In an embodiment, the labeling engine presents content and/or contextual attributes associated with a conversation snippet on a user interface. The labeling engine receives user input indicating a sentiment score for the conversation snippet. The labeling engine stores the entered sentiment score as a labeled sentiment score corresponding to the conversation snippet.

In an embodiment, the labeling engine receives a sentiment score for a conversation snippet from another application. The application may have determined the sentiment score by applying a set of rules to known attributes associated with the conversation snippet. For example, the application may monitor a progress of the project that the conversation snippet is about. The application may determine whether deadlines for the project were met. The timeliness in meeting the project deadlines may be a factor in determining a sentiment score for the conversation snippet. A higher sentiment score may be determined where deadlines were met; a lower sentiment score may be determined where deadlines were not met. Additional and/or alternative factors for determining a sentiment score for the conversation snippet may be used, such as whether the conversation snippet includes words associated with positive or negative sentiment. The labeling engine stores the sentiment score, received from the other application, as a labeled sentiment score corresponding to the conversation snippet.

One or more embodiments include converting content of each conversation snippet into one or more document matrices (Operation 1106). The machine learning system converts content of each conversation snippet into one or more document matrices. Examples of operations for converting conversation content into a document matrix are described above with reference to Operation 804 of FIG. 8.

One or more embodiments include obtaining a respective set of one or more contextual attributes associated with each conversation snippet (Operation 1108). The machine learning system obtains sets of contextual attributes associated with each conversation snippet. Examples of operations for obtaining contextual attributes associated with a conversation snippet are described above with reference to Operation 810 of FIG. 8.

One or more embodiments include converting each set of contextual attributes into a respective context vector (Operation 1110). The machine learning system converts each set of contextual attributes into a respective context vector. Examples of operations for converting contextual attributes into a context vector are described above with reference to Operation 812 of FIG. 8.

One or more embodiments include generating a training set including (a) the document matrices, (b) corresponding context vectors, and (c) corresponding labeled sentiment scores (Operation 1112). The machine learning system generates a training set for inputting into a machine learning algorithm.

The machine learning system stores a document matrix associated with a particular conversation snippet (obtained at Operation 1106), a context vector associated with the particular conversation snippet (obtained at Operation 1110), and a labeled sentiment score for the particular conversation snippet (obtained at Operation 1104) in association with each other. The above associated information may be referred to as a "dataset." The machine learning system iterates the above process for each conversation snippet to store a dataset for each conversation snippet. The datasets form a training set for inputting into a machine learning algorithm.

One or more embodiments include generating hidden layer sequences of an ANN, wherein at least one hidden layer sequence accepts as input a document matrix and at least one hidden layer sequence accepts as input a context vector (Operation 1114). The machine learning system generates hidden layer sequences of an ANN.

The machine learning system generates at least one hidden layer sequence that accepts as input a document matrix. For example, the machine learning system may generate one or more of hidden layer sequences 414*a-d* of FIG. 4. The machine learning system may instantiate neurons for a conversational layer, a max pooling layer, and/or a multiplication layer.

The machine learning system generates at least one hidden layer sequence that accepts as input a context vector. For example, the machine learning system may generate hidden layer sequences 414*e* of FIG. 4. The machine learning system may instantiate neurons for one or more fully connected layers.

One or more embodiments include training the ANN using the training set to generate a sentiment analysis engine (Operation 1116). The machine learning system inputs the training set (generated at Operation 1112) to a machine learning algorithm. Based on the machine learning algorithm, the machine learning system applies backpropagation or other methods to the training set to determine weights and/or activation functions associated with the ANN (generated at Operation 1114). The ANN with the determined weights and/or activation functions may be referred to as a "sentiment analysis engine."

7. Training a Neural Network For Determining Project Management Scores

Figure 12:
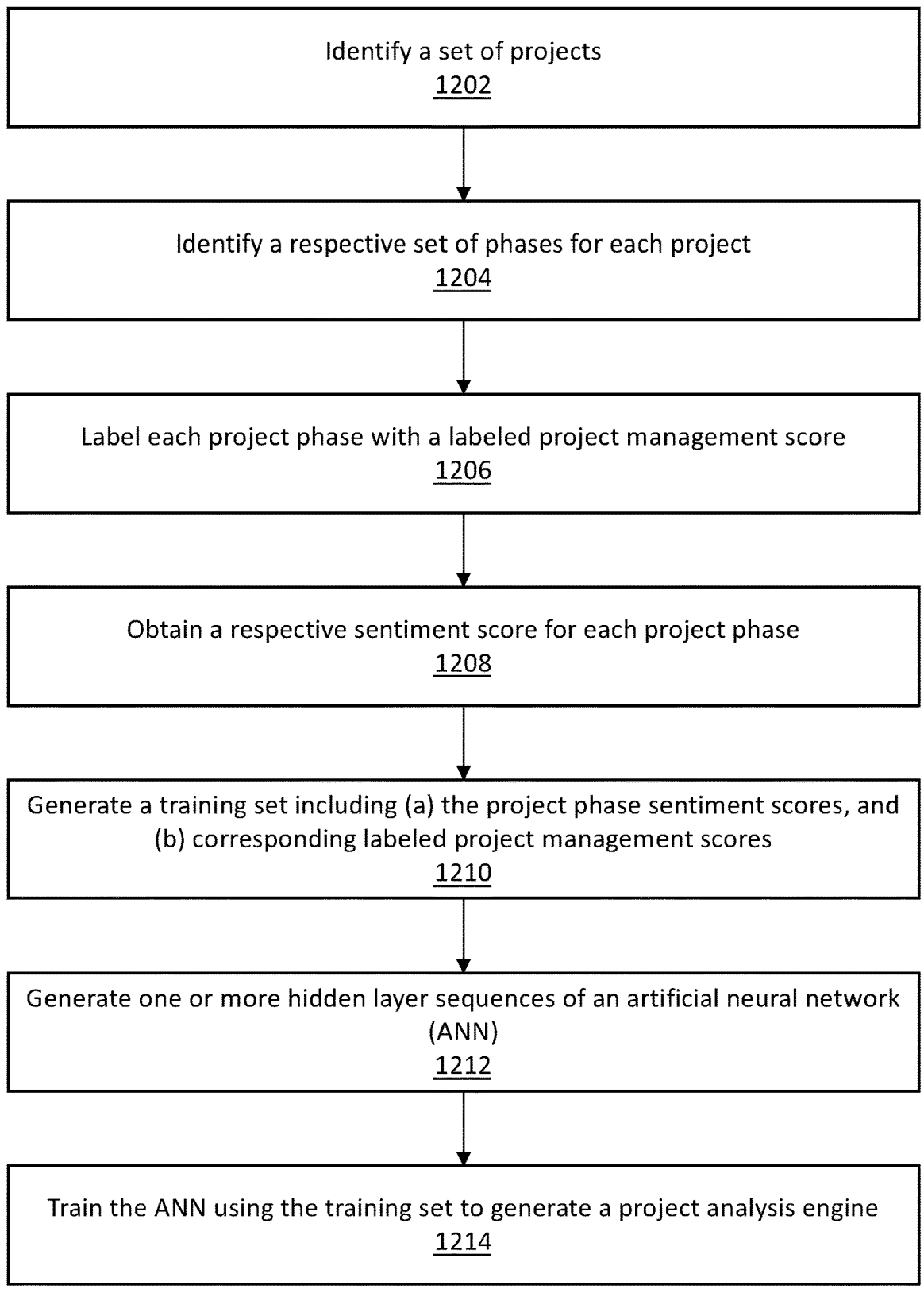
FIG. 12 illustrates an example set of operations for training a neural network for determining project management scores, in accordance with one or more embodiments.

FIG. 12 illustrates an example set of operations for training a neural network for determining project management scores, in accordance with one or more embodiments. One or more operations illustrated in FIG. 12 may be modified, rearranged, or omitted all together. Accordingly, the particular sequence of operations illustrated in FIG. 12 should not be construed as limiting the scope of one or more embodiments.

One or more embodiments include identifying a set of projects (Operation 1202). A machine learning system identifies a set of projects from a project management application, and/or other application or data repository. The machine learning system may, for example, look up an index of projects on the project management application.

One or more embodiments include identifying a respective set of phases for each project (Operation 1204). The machine learning system identifies a respective set of phases for each project.

In an embodiment, the machine learning system analyzes a particular project stored on a project management application. The machine learning system determines a set of phases for the particular project, as indicated by the project management application. The machine learning system determines start and end dates for each project phase, as indicated by the project management application. The machine learning system iterates the above process for each of the set of projects to determine phases of each project.

One or more embodiments include labeling each project phase with a respective labeled project management score (Operation 1206). A labeling engine of the machine learning system labels each project phase with a labeled project management score.

In an embodiment, the labeling engine presents information identifying a project phase on a user interface. The labeling engine receives user input indicating a project management score for the project phase. The labeling engine stores the entered project management score as a labeled project management score corresponding to the project phase of the project.

In an embodiment, the labeling engine receives a project management score for a project phase from a project management application and/or other application. The application may have determined the project management score by applying a set of rules to known attributes associated with the project phase. For example, the application may monitor a progress of the project during the project phase. The application may determine whether deadlines for the project phase were met. The application may determine a number of times that a plan for the project was changed during the project phase. The application may determine changes to the development team for the project during the project phase. Based on the above factors, the application may determine a project management score for the project phase. The labeling engine stores the project management score, received from the other application, as a labeled project management score corresponding to the project phase of the project.

One or more embodiments include obtaining a respective sentiment score for each project phase (Operation 1208). The machine learning system obtains a respective sentiment score for each project phase. Examples of operations for obtaining a project phase sentiment score are described above with reference to Operation 1002 of FIG. 10.

One or more embodiments include generating a training set including (a) the project phase sentiment score and (b) corresponding labeled project management score (Operation 1210). The machine learning system generates a training set for inputting into a machine learning algorithm.

The machine learning system stores a sentiment score for a particular project phase (obtained at Operation 1208) and a labeled project management score for the particular project phase in association with each other. The above associated information may be referred to as a "dataset." The machine learning system iterates the above process for each project phase to store a dataset for each project phase. The project phase sentiment scores are thereby time-aligned with the labeled project management scores. The datasets form a training set for inputting into a machine learning algorithm.

One or more embodiments include generating one or more hidden layer sequences of an ANN (Operation 1212). The machine learning system generates hidden layer sequences of an ANN. The machine learning system may instantiate neurons for each hidden layer within a hidden layer sequence.

One or more embodiments include training the ANN using the training set to generate a project analysis engine (Operation 1214). The machine learning system inputs the training set (generated at Operation 1210) to a machine learning algorithm. Based on the machine learning algorithm, the machine learning system applies backpropagation or other methods to the training set to determine weights and/or activation functions associated with the ANN (generated at Operation 1212). The ANN with the determined weights and/or activation functions may be referred to as a "project analysis engine."

8. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 13:
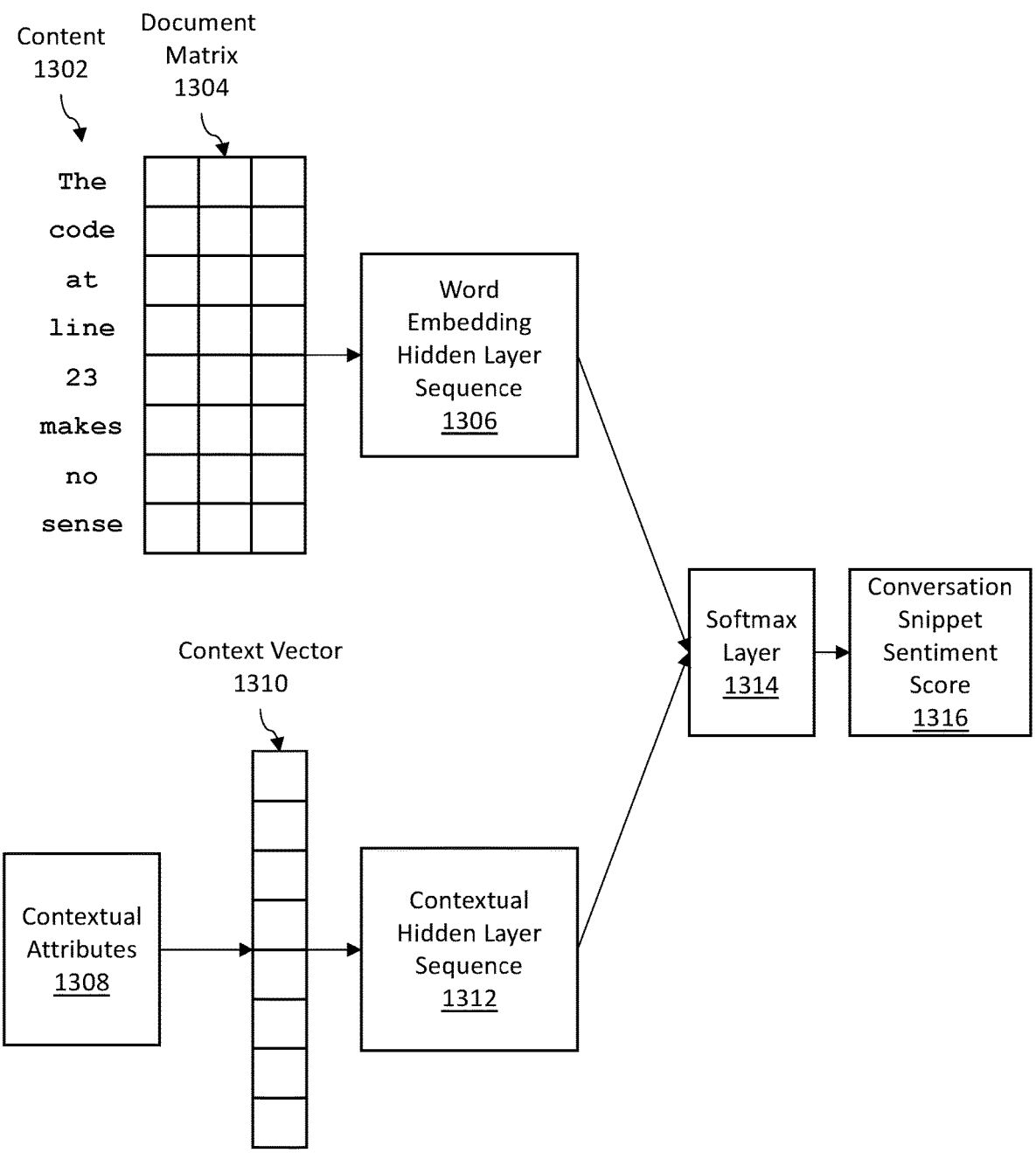
FIG. 13 illustrates an example for determining a conversation snippet sentiment score based on content and contextual attributes associated with a conversation snippet, in accordance with one or more embodiments.

FIG. 13 illustrates an example for determining a conversation snippet sentiment score based on content and contextual attributes associated with a conversation snippet, in accordance with one or more embodiments.

Content 1302 of a conversation snippet may include "The code at line 23 makes no sense." Each word is converted into an embedding vector based on a model for word embedding. The embedding vectors together form a document matrix 1304. As illustrated, for example, the term "the" corresponds to an embedding vector at the first row of document matrix 1304. The term "code" corresponds to an embedding vector at the second row of document matrix 1304. The term "at" corresponds to an embedding vector at the third row of document matrix 1304.

The document matrix 1304 is input into a word embedding hidden layer sequence 1306. The word embedding hidden layer sequence 1306 may include various hidden layers, such as a convolutional layer and a max pooling layer. The word embedding hidden layer sequence 1306 outputs an intermediate representation, which is fed into a softmax layer 1314.

Contextual attributes 1308 associated with the conversation snippet are determined. The contextual attributes 1308 are converted into a context vector 1310. The context vector 1310 is input into a contextual hidden layer sequence 1312. The contextual hidden layer sequence 1312 may include various hidden layers, such as one or more fully connected layers. The contextual hidden layer sequence 1312 outputs an intermediate representation, which is fed into the softmax layer 1314.

The softmax layer 1314 processes the intermediate representations from the word embedding hidden layer sequence 1306 and the contextual hidden layer sequence 1312. The softmax layer 1314 outputs a conversation snippet sentiment score 1316. The conversation snippet sentiment score 1316 may indicate that a positive sentiment probability for the conversation snippet is 18% and a negative sentiment probability for the conversation snippet is 82%.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 14:
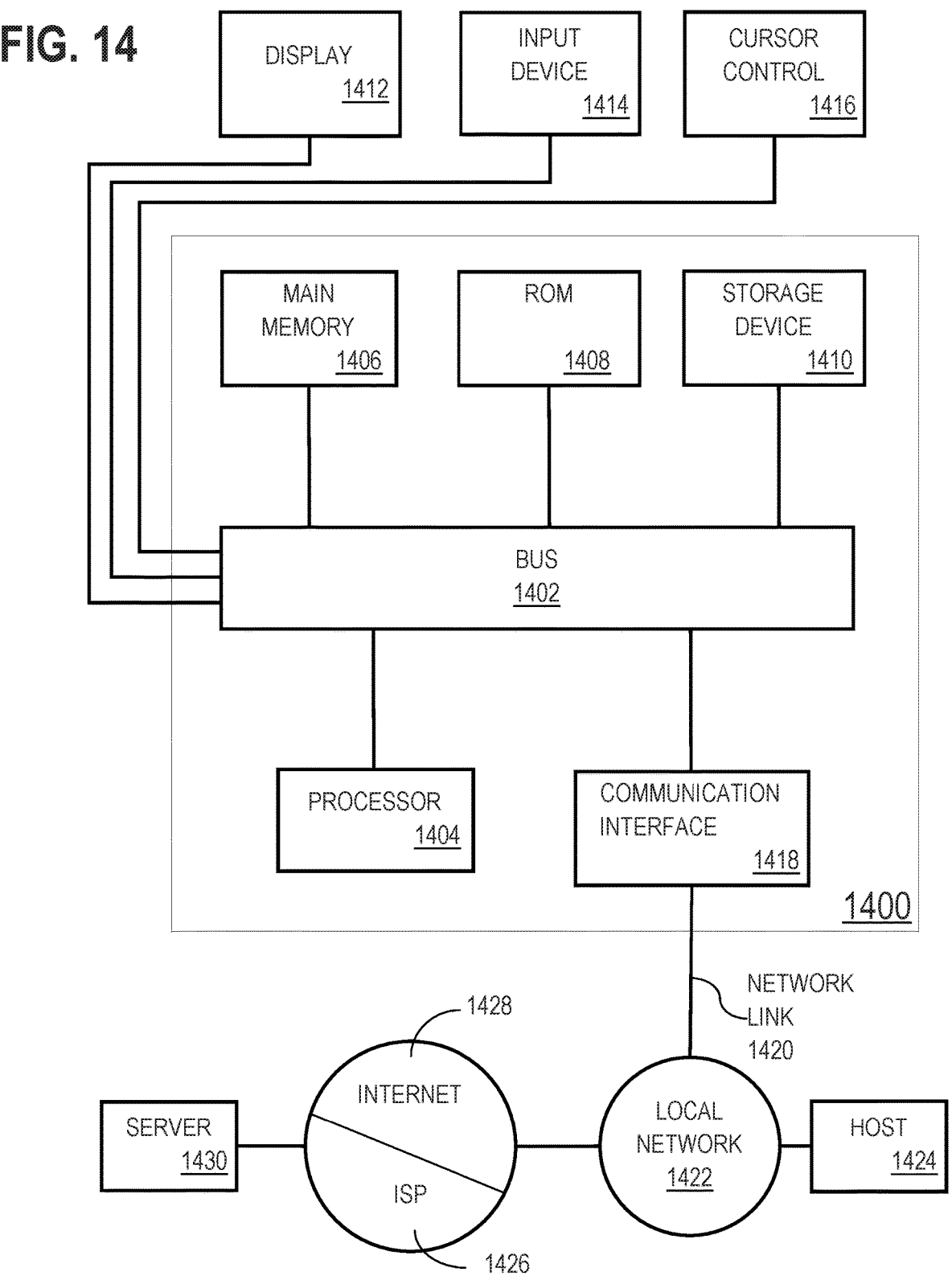
FIG. 14 shows a block diagram that illustrates a computer system in accordance with one or more embodiments.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   obtaining a first conversation snippet from a first conversation channel;
   converting content of the first conversation snippet into a first document matrix;
   inputting the first document matrix to a first hidden layer sequence, of an artificial neural network, to determine a first intermediate representation;
   obtaining a first set of one or more contextual attributes associated with the first conversation snippet;
   converting the first set of contextual attributes into a first context vector;
   inputting the first context vector to a second hidden layer sequence, of the artificial neural network, to determine a second intermediate representation;
   inputting a first set of intermediate representations, comprising the first intermediate representation and the second intermediate representation, into an output layer of the artificial neural network;
   based on the output layer of the artificial neural network, determining a first conversation snippet sentiment score for the first conversation snippet.

2. The one or more media of claim 1, wherein the second hidden layer sequence comprises a multilayer perceptron for analyzing the context vector.

3. The one or more media of claim 1, wherein the first hidden layer sequence comprises at least one of a word embedding layer and a lexicon embedding layer.

4. The one or more media of claim 1, further storing instructions which, when executed by the one or more processors, cause:
   inputting the first document matrix to a third hidden layer sequence, of the artificial neural network, to determine a third intermediate representation;
   wherein the set of intermediate representations input into the output layer of the artificial neural network further comprises the third intermediate representation.

5. The one or more media of claim 4, wherein the first hidden layer sequence comprises a word embedding layer and the third hidden layer comprises an attention-based word embedding layer.

6. The one or more media of claim 1, further storing instructions which, when executed by the one or more processors, cause:
   converting content of the first conversation snippet into a second document matrix;
   inputting the second document matrix to a third hidden layer sequence, of the artificial neural network, to determine a third intermediate representation;
   wherein the set of intermediate representations input into the output layer of the artificial neural network further comprises the third intermediate representation.

7. The one or more media of claim 1, wherein the contextual attributes comprise one or more of:
   a role, within an organizational hierarchy, of a user participating in the first conversation snippet;
   a work location of the user participating in the first conversation snippet;
   a work experience of the user participating in the first conversation snippet;
   a collaborator group of the user participating in the first conversation snippet;
   a project size of a project associated with the first conversation snippet;
   a project phase, of the project, during which the first conversation snippet is conducted;
   a duration of time until a next milestone deadline of the project at a time the first conversation snippet is conducted.

8. The one or more media of claim 1, further storing instructions which, when executed by the one or more processors, cause:
   obtaining a second conversation snippet from a second conversation channel, wherein the first conversation snippet and the second conversation snippet are conducted during a first phase of a target project;
   converting content of the second conversation snippet into a second document matrix;
   inputting the second document matrix to the first hidden layer sequence, of the artificial neural network, to determine a third intermediate representation;
   obtaining a second set of one or more contextual attributes associated with the second conversation snippet;
   converting the second set of contextual attributes into a second context vector;
   inputting the second context vector to the second hidden layer sequence, of the artificial neural network, to determine a fourth intermediate representation;
   inputting a second set of intermediate representations, comprising the third intermediate representation and the fourth intermediate representation, into the output layer of the artificial neural network;
   based on the output layer of the artificial neural network, determining a second conversation snippet sentiment score for the second conversation snippet;
   determining a first set of weighing attributes associated with the first conversation snippet;
   determining a first weight to be applied to the first conversation snippet sentiment score based on the first set of weighing attributes;
   determining a second set of weighing attributes associated with the second conversation snippet;
   determining a second weight to be applied to the second conversation snippet sentiment score based on the second set of weighing attributes;
   aggregating at least the first conversation snippet sentiment score and the second conversation snippet sentiment score to determine a first project phase sentiment score for the first phase of the target project, at least by:
      applying the first weight to the first conversation snippet sentiment score;
      applying the second weight to the second conversation snippet sentiment score.

9. The one or more media of claim 1, further storing instructions which, when executed by the one or more processors, cause:
   obtaining a plurality of conversation snippets from a plurality of conversation channels;
   obtaining a plurality of labeled sentiment scores respectively corresponding to the plurality of conversation snippets;
   converting content of the plurality of conversation snippets into respective document matrices;
   obtaining a plurality of contextual attributes respectively corresponding to the plurality of conversation snippets;
   converting the plurality of contextual attributes into respective context vectors;

generating a training set including the document matrices, the context vectors, and the plurality of labeled sentiment scores;

generating a plurality of hidden layer sequences of the first artificial neural network, wherein the plurality of hidden layer sequences comprises the first hidden layer sequence and the second hidden layer sequence;

training the first artificial neural network using the training set.

10. The one or more media of claim 1, wherein the first conversation channel comprises at least one of:

a directory of meeting minutes;
a directory of meeting presentations;
a debugging application;
a social media platform;
an instant messaging platform;
an electronic mail platform.

11. The one or more media of claim 1, wherein the output layer comprises a softmax layer.

12. The one or more media of claim 1, wherein the first conversation snippet sentiment score comprises (a) a first value indicating a first probability that the first conversation snippet is associated with a positive sentiment and (b) a second value indicating a second probability that the first conversation snippet is associated with a negative sentiment.

13. One or more non-transitory machine-readable media storing instructions which, when executed by one or more processors, cause:

obtaining a plurality of conversation snippets associated with a particular topic;

inputting at least the plurality of conversation snippets into an artificial neural network to obtain a plurality of sentiment scores respectively corresponding to the plurality of conversation snippets;

obtaining respective sets of weighing attributes associated with each of the plurality of conversation snippets;

determining respective weights based on each of the sets of weighing attributes;

applying the weights to the plurality of sentiment scores to determine an overall sentiment score associated with the particular topic;

wherein a particular set of weighing attributes, of the sets of weighing attributes, is associated with a particular conversation snippet, of the plurality of conversation snippets;

wherein the particular conversation snippet is conducted over a particular conversation channel of a plurality of conversation channels; and wherein the particular set of weighing attributes comprises one or more of:

a distribution of the plurality of conversation snippets associated with the particular topic across the plurality of conversation channels;

a proportion of a first subset of the plurality of conversation snippets that is conducted using the particular conversation channel as compared with the plurality of conversation channels;

a number of users participating in the first subset of the plurality of conversation snippets that is conducted using the particular conversation channel;

respective roles of the users participating in the first subset of the plurality of conversation snippets that is conducted using the particular conversation channel;

a frequency at which users of certain roles participate in the first subset of the plurality of conversation snippets that is conducted using the particular conversation channel;

a number of a second subset of the plurality of conversation snippets that is associated with a particular user participating in the particular conversation snippet;

a particular time or day during which the particular conversation snippet is conducted.

14. The one or more media of claim 13, wherein the plurality of conversation snippets are conducted within a particular time period, and the overall sentiment score is associated with the particular topic and the particular time period.

15. The one or more media of claim 13, wherein the plurality of conversation snippets are conducted by a particular group of users, and the overall sentiment score is associated with the particular topic and the particular group of users.

16. The one or more media of claim 13, wherein the overall sentiment score associated with the particular topic comprises a project phase sentiment score associated with a target phase of a target project.

17. The one or more media of claim 16, further storing instructions which, when executed by the one or more processors, cause:

inputting the project phase sentiment score into an artificial neural network to determine a project management score for the target phase of the target project.

18. The one or more media of claim 13, wherein at least one of the plurality of sentiment scores is determined using an artificial neural network.

19. The one or more media of claim 13, wherein a particular sentiment score, of the plurality of sentiment scores, associated with a particular conversation snippet, of the plurality of conversation snippets, is determined based on a contextual attribute associated with the particular conversation snippet.

20. The one or more media of claim 19, wherein the contextual attribute and a weighing attribute, of the sets of weighing attributes, are same.

21. One or more non-transitory machine-readable media storing instructions which, when executed by one or more processors, cause:

obtaining a first plurality of conversation snippets associated with a first phase of a target project;

obtaining a first plurality of sentiment scores respectively corresponding to the first plurality of conversation snippets;

obtaining a first plurality of sets of weighing attributes respectively associated with the first plurality of conversation snippets;

wherein a first set of weighing attributes, of the first plurality of sets of weighing attributes, is associated with a first conversation snippet, of the first plurality of conversation snippets;

determining a first plurality of weights respectively associated with the first plurality of conversation snippets based respectively on the first plurality of sets of weighing attributes;

wherein a first weight, of the first plurality of weights, associated with the first conversation snippet is determined based on the first set of weighing attributes;

applying the plurality of weights respectively to the first plurality of sentiment scores to determine a first project phase sentiment score associated with the first phase of the target project;

obtaining a second plurality of conversation snippets associated with a second phase of the target project;

based on the second plurality of conversation snippets, determining a second project phase sentiment score associated with the second phase of the target project;

obtaining a first labeled project management score corresponding to the first phase of the target project;

obtaining a second labeled project management score corresponding to the second phase of the target project;

generating a training set including the first project phase sentiment score, the second project phase sentiment score, the first labeled project management score, and the second labeled project management score;

training an artificial neural network using the training set, wherein the artificial neural network is configured to determine a project management score based on a given project phase sentiment score.

22. The one or more media of claim 21, wherein the training set includes time-aligned project phase sentiment scores and labeled project management scores.

\* \* \* \* \*

UNITED STATES PATENT AND TRADEMARK OFFICE
CERTIFICATE OF CORRECTION

PATENT NO. : 11,151,328 B2
APPLICATION NO. : 16/529726
DATED : October 19, 2021
INVENTOR(S) : Prasad et al.

Page 1 of 1

It is certified that error appears in the above-identified patent and that said Letters Patent is hereby corrected as shown below:

In the Drawings

On sheet 5 of 14, in FIG. 5, under Reference Numeral 526a, Line 1, delete "Intermedia" and insert -- Intermediate --, therefor.

On sheet 5 of 14, in FIG. 5, under Reference Numeral 526b, Line 1, delete "Intermedia" and insert -- Intermediate --, therefor.

On sheet 5 of 14, in FIG. 5, under Reference Numeral 526c, Line 1, delete "Intermedia" and insert -- Intermediate --, therefor.

On sheet 5 of 14, in FIG. 5, under Reference Numeral 526d, Line 1, delete "Intermedia" and insert -- Intermediate --, therefor.

On sheet 5 of 14, in FIG. 5, under Reference Numeral 526e, Line 1, delete "Intermedia" and insert -- Intermediate --, therefor.

In the Specification

In Column 19, Line 46, delete "v[2 ]=whether" and insert -- v[2]=whether --, therefor.

In Column 22, Line 39, delete "similar" and insert -- similar. --, therefor.

In Column 22, Line 57, delete "similar" and insert -- similar. --, therefor.

In Column 23, Line 29, delete "snippet" and insert -- snippet. --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*